(12) United States Patent
Worsley et al.

(10) Patent No.: US 9,543,569 B2
(45) Date of Patent: Jan. 10, 2017

(54) GRAPHENE-SUPPORTED METAL OXIDE MONOLITH

(71) Applicant: Lawrence Livermore National Security, LLC, Livermore, CA (US)

(72) Inventors: Marcus A. Worsley, Hayward, CA (US); Theodore F. Baumann, Discovery Bay, CA (US); Juergen Biener, San Leandro, CA (US); Monika A. Biener, San Leandro, CA (US); Yinmin Wang, Tracy, CA (US); Jianchao Ye, Livermore, CA (US); Elijah Tylski, Platte City, MO (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 562 days.

(21) Appl. No.: 13/844,175

(22) Filed: Mar. 15, 2013

(65) Prior Publication Data

US 2014/0178759 A1    Jun. 26, 2014

Related U.S. Application Data

(60) Provisional application No. 61/745,522, filed on Dec. 21, 2012.

(51) Int. Cl.

| | |
|---|---|
| *H01B 1/04* | (2006.01) |
| *H01B 1/08* | (2006.01) |
| *B82Y 30/00* | (2011.01) |
| *H01M 4/96* | (2006.01) |
| *H01G 9/00* | (2006.01) |
| *H01M 4/131* | (2010.01) |
| *H01G 11/36* | (2013.01) |

(Continued)

(52) U.S. Cl.
CPC ............. *H01M 4/131* (2013.01); *H01G 11/36* (2013.01); *H01G 11/46* (2013.01); *B82Y 30/00* (2013.01); *B82Y 40/00* (2013.01); *H01M 4/1391* (2013.01); *H01M 10/0525* (2013.01); *H01M 2004/021* (2013.01); *Y02E 60/122* (2013.01); *Y02E 60/13* (2013.01)

(58) Field of Classification Search
CPC ............... H01B 1/04; H01B 1/08; H01M 4/96
USPC .... 252/500–519.1; 428/437, 368; 429/231.8; 977/734, 932
See application file for complete search history.

(56) References Cited

U.S. PATENT DOCUMENTS

| | | |
|---|---|---|
| 5,207,814 A | 5/1993 | Cogliati |
| 5,879,744 A | 3/1999 | Cao |

(Continued)

OTHER PUBLICATIONS

Chen et al. (Self-Assembly and Embedding of Nanoparticles by In Situ Reduced Graphene for Preparation of a 3D Graphene/Nanoparticle Aerogel. Adv Mat, 23, pp. 5679-5683, online Nov. 4, 2014).*

(Continued)

*Primary Examiner* — Tri V Nguyen
(74) *Attorney, Agent, or Firm* — Foley & Lardner LLP

(57) ABSTRACT

A composition comprising at least one graphene-supported metal oxide monolith, said monolith comprising a three-dimensional structure of graphene sheets crosslinked by covalent carbon bonds, wherein the graphene sheets are coated by at least one metal oxide such as iron oxide or titanium oxide. Also provided is an electrode comprising the aforementioned graphene-supported metal oxide monolith, wherein the electrode can be substantially free of any carbon-black and substantially free of any binder.

17 Claims, 25 Drawing Sheets

(51) Int. Cl.

| | |
|---|---|
| H01G 11/46 | (2013.01) |
| B82Y 40/00 | (2011.01) |
| H01M 4/1391 | (2010.01) |
| H01M 10/0525 | (2010.01) |
| H01M 4/02 | (2006.01) |

(56) References Cited

U.S. PATENT DOCUMENTS

| | | | |
|---|---|---|---|
| 5,885,953 | A | 3/1999 | Jadesjo |
| 7,378,188 | B2 | 5/2008 | Struthers |
| 7,410,718 | B2 | 8/2008 | Cooper |
| 7,811,711 | B2 | 10/2010 | Cooper |
| 2010/0144904 | A1 | 6/2010 | Wang |
| 2010/0187484 | A1 | 7/2010 | Worsley |
| 2011/0177938 | A1* | 7/2011 | Scheab et al. ............... 502/185 |
| 2011/0224376 | A1* | 9/2011 | Zhai et al. ................... 525/186 |
| 2012/0034442 | A1 | 2/2012 | Pauzauskie |
| 2014/0042390 | A1* | 2/2014 | Gruner et al. ................. 257/14 |
| 2015/0030968 | A1* | 1/2015 | Schwab et al. .............. 429/532 |
| 2015/0064501 | A1* | 3/2015 | Ren et al. ........................ 429/2 |

OTHER PUBLICATIONS

Wu (3D Nitrogen-Doped Graphene Aerogel-Supported Fe3O4 Nanoparticles as Efficient Eletrocatalysts for the Oxygen Reduction Reaction. JACS, 134, pp. 9082-9085, May 2012).*
Wu ("Three-Dimensional Graphene-Based Macro- and Mesoporous Frameworks for High-Performance Electrochemical Capacitive Energy Storage." JACS, 134, pp. 19532-19535, Nov. 2012).*
Al-Muhtaseb, et al., "Preparation and properties of resorcinol-Formaldehyde organic and carbon gels", Advanced Materials, No. 2, 15: 101-114, (2003).
Arora, et al., "Capacity fade mechanisms and side reactions in Lithium-Ion batteries", J. Electroshem. Soc., 145(10): 3647-3667, (1998).
Balandin, et al., "Superior thermal conductivity of single-layer graphene", Nano Letters, vol. 8, No. 3, 902-907, (2008).
Baldan, et al., "Raman validity for crystallite size $L_a$ determination on reticulated vitreous carbon with different graphitization index", Applied Surface Science, 254: 600-603, (2007).
Batson, "Carbon 1s near-edge-absorption fine structure in graphite", Physical Review B, vol. 48, No. 4, 2608-2610, (1993).
Baumann, et al., "Facile synthesis of a crystalline, high-surface-area $SnO_2$ aerogel", Advanced Materials, 17: 1546-1548, (2005).
Biener, et al., "Advanced carbon aerogels for energy applications", Energy & Environmental Science, 4:656-667, (2011).
Chen, et al., "In situ self-assembly of mild chemical reduction graphene for three-dimensional architectures", Nanoscale, 3: 3132-3137, (2011).
Chen, et al., "Three-dimensional flexible and conductive interconnected grapheme networks grown by chemical vapour deposition", Nature Materials, vol. 10, pp. 424-428, (2011).
Cote, et al., "Flash reduction and patterning of graphite oxide and its polymer composite", JACS Articles, 131: 11027-11032, (2009).
Eda, et al., "Large-area ultrathin films of reduced graphene oxide as a transparent and flexible electronic material", Nature Nanotechnology, vol. 3, 270-274, (2008).
Ferrari, et al., "Interpretation of Raman spectra of disordered and amorphous carbon", Physical Review B, vol. 61, No. 20, 14095-14107, (2000).
Ferrari, et al., "Raman spectrum of graphene and graphene layers", PRL 97: 187401-1-187401-4, (2006).
Fowler, et al., "Practically chemical sensors from chemically deprived graphene", ACSNANO, vol. 3, No. 2, 301-306, (2009).
Gash, et al., "Strong Akaganeite aerogel monoliths using epoxides: Synthesis and Characterization", Chem. Materials, 15: 3268-3275, (2003).
Geim, et al., "The rise of graphene", Nature Materials, vol. 6, 183-191, (2007).
Ghosh, et al., "Extremely high thermal conductivity of graphene: Prospects for thermal management applications in nanoelectronic circuits", Applied Physics Letters, 92: 151911-1-151911-3, (2008).
Gomez-Navarro, et al., "Electronic transport properties of individual chemically reduced grapheme oxide sheets", Nano Letters, vol. 7, No. 11, 3499-3503, (2007).
Graf, et al., "Spatially resolved Raman spectroscopy of single and few-layer graphene", Nano Letters, vol. 7, No. 2, 238-242, (2007).
Gregg, et al., Adsorption, surface area and porosity, Second Edition, Academic Press 1982, Cover and table of contents.
Ha, et al., "Binder-free and carbon-free nanoparticle batteries: A method for nanoparticle electrodes without polymeric binders or carbon black", Nano Letters, 12: 5122-5130, (2012).
Huang, et al., "In Situ observation of the electrochemical Lithiation of a single $SnO_2$ Nanowire electrode", Science, vol. 330, 1515-1520, (2010).
Hummers, et al., "Preparation of Graphite Oxide", Contribution from the Baroid Graphitic Oxide, 1339, (1958).
Hwang, et al., "Carrier transport in two-dimensional graphene layers", Physical Review Letters, 186806-1-186806-4, (2007).
Iler, Ralph, The chemistry of Silica: Solubility, Polymerization, Colloid and surface properties and biochemistry of Silica, ISBN:9780471024040, Cover and Table of Contents, 1979.
Jain, et al., "Structural studies of lithium intercalation in a nanocrystalline $\alpha$-$Fe_2O_3$ compound", Chem. Materials, 18: 423-434, (2006).
Jeong, et al., "X-ray absorption spectroscopy of graphite oxide", EPL, 67004-p1-67004-p5, (2008).
Jeong, et al., Comment on "Near-Edge x-Ray absorption fine-structure investigation of graphene", PRL, 102: 099701-1, (2009).
Kucheyev, et al., "Depth-sensing indentation of low-density brittle nanoporous solids", Acta Materialia, 57: 3472-3480, (2009).
Kuhn, et al., "In situ infrared observation of the pyrolysis process of carbon aerogels", Journal of Non-Crystalline Solids, 225: 58-63, (1998).
Larcher, et al., "Combined XRD, EXAFS, and Mossbauer studies of the reduction by Lithium of $\alpha$-$Fe_2O_3$ with various particle sizes", Journal of Electrochemical Society, 150(12): A1643-A1650, (2003).
Laruelle, et al., "On the origin of the extra electrochemical capacity displayed by MO/Li cells at low potential", Journal of the electrochemical society, 149(5): A627-A634, (2002).
Lee, et al., "Measurement of the elastic properties and intrinsic strength of monolayer grapheme", Science, vol. 321, 385-388, (2008).
Li, et al., "Highly conducting graphene sheets and Langmuir-Blodgett films", Nature Nanotechnology, vol. 3, 538-542, (2008).
Liu, et al., "A controllable self-assembly method for larger-scale synthesis of graphene sponges and free-standing graphene films", Advanced Functional Materials, 20: 1930-1936, (2010).
Lu, et al., "Thermal and electrical conductivity of monolithic carbon aerogels", Journal of Applied Physics, 73: 581-584, (1993).
Ma, et al., "Core excitons and vibronic coupling in diamond and graphite", Physical Review Letters, vol. 71, No. 22, 3725-3728, (1993).
McAllister, et al., "Single sheet functionalized graphene by oxidation and thermal expansion of graphite", Chem. Mater., 19: 4396-4404, (2007).
Morales, et al., "Synthesis and characterization of Nanometric iron and iron-Titanium oxides by mechanical milling: Electrochemical properties as anodic materials in Lithium cells", Journal of the electrochemical society, 152(9): A1748-A1754, (2005).
Morozov, et al., "Giant intrinsic carrier Mobilities in graphene and its bilayer", Physical Review Letters, 016602-1-016602-4, (2008).
Novoselov, et al., "Electric field affect in atomically thin carbon films", Science, vol. 306, 666-669, (2004).
Oliver, et al., "An improved technique for determining hardness and elastic modulus using load and displacement sensing indentation experiments", J. Mater. Res., vol. 7, No. 6, 1564-1583, (1992).
Pacile, et al., "Near-Edge X-Ray absorption fine-Structure investigation of Graphene", PRL, 101: 066806-1-066806-4, (2008).
Pacile, et al., Reply to comment on "Near-Edge X-Ray absorption fine-Structure investigation of Graphene", PRL, 102: 099702, (2009).

(56) References Cited

OTHER PUBLICATIONS

Peigney, et al., "Specific surface area of carbon nanotubes and bundles of carbon nanotubes", Carbon, 39: 507-514, (2001).
Peled, "Lithium stability and film formation in organic and inorganic electrolyte for lithium battery systems", Department of Chemistry, Tel-Aviv University, Israel, pp. 43-72, (1983).
Pekala, et al., "Resorrcinol-Formaldehyde aerogels and their carbonized derivatives", Abstracts of Papers of the American Chemical Society, 197, 113, (1989).
Poizot, et al., "Nano-sized transition-metal oxides as negative-electrode materials for lithium-ion batteries", Nature, vol. 407, 496-499, (2000).
Ramanathan, et al., "Functionalized graphene sheets for polymer nanocomposites", Nature Nanotechnology, vol. 3, 327-331, (2008).
Schedin, et al., "Detection of individual gas molecules adsorbed on graphene", Nature Materials, vol. 6, 652-655, (2007).
Shao, et al., "Graphene based electrochemical sensors and biosensors: A Review", Electroanalysis, 22: No. 10, 1027-1036, (2010).
Stankovich, et al., "Graphene-based composite materials", Nature Letters, vol. 442, 282-286, (2006).
Joachim Stohr, Nexafs Spectroscopy; Spinger-Verlag: Berlin—Heidelberg—New York, Cover and Table of Contents, (1992).
Sutter, et al., "Epitaxial graphene on ruthenium", Nature Materials, vol. 7, 406-411, (2008).
Takai, et al., "Structure and electronic properties of a nongraphitic disordered carbon system and its heat-treatment effects", Physical Review B, 67: 214202-1-214202-11, (2003).
Tang, et al., "Noble-metal-promoted three-dimensional macroassembly of single-layered graphene oxide", Angew. Chem., 49: 4603-4607, (2010).
Verdejo, et al., "Functionalized graphene sheet filled silicone foam nanocomposites", Journal of Materials Chemistry, 18: 2221-2226, (2008).
Vickery, et al., "Fabrication of graphene-polymer nanocomposites with higher-order three-dimensional architectures", Advanced Materials, 21: 2180-2184, (2009).
Vivekchand, et al., "Graphene-based electrochemical supercapacitors", J. Chem. Sci., vol. 120, No. 1, 9-13, (2008).
Vollmer, et al., "Electronic and structural properties of graphene-based transparent and conductive thin film electrodes", Appl. Phys A, 94: 1-4, (2009).
Wang, et al., "Graphene Aerogels", ECS Transactions, 19(5): 241-247, (2009).
Wang, et al., "$Mn_3O_4$-Graphene hybrid as a high-capacity anode material for lithium ion batteries", J. Am. Chem. Soc, 132: 13978-13980, (2010).
Wang, et al., "Ternary self-assembly of ordered metal oxide-Graphene nanocomposites for electrochemical energy storage", vol. 4, No. 3, 1587-1595, (2010).
Wang, et al., "Transparent, conductive graphene electrodes for dye-sensitized solar cells", Nano Letters, vol. 8, No. 1, 323-327, (2008).
Worsley, et al., "High surface area carbon nanotube-supported titanium carbonitride aerogels", Journal of Materials Chemistry, 19: 5503-5506, (2009).
Worsley, et al., "High surface area, $sp^2$-cross-linked three-dimensional grapheme monoliths", The Journal of Physical Chemistry Letters, 2: 921-925, (2011).
Worsley, et al., "Mechanically robust 3D grapheme macroassembly with high surface area", Electronic Supplementary Material (ESI) for Chemical Communications, 1-6, (2012).
Worsley, et al., "Mechanically robust 3D grapheme macroassembly with high surface area", Chemical Communications, 48: 8428-8430, (2012).
Worsley, et al., "Mechanically robust and electrically conductive carbon nanotube foams", Applied Physics Letters, 94: 073115-1-073115-3, (2009).
Worsley, et al., "Properties of single-walled carbon nanotube-based aerogels as a function of nanotube loading", Acta Materialia, 57: 5131-5136, (2009).
Worsley, et al., "Stiff and electrically conductive composites of carbon nanotube aerogels and polymers", Journal of Materials Chemistry, 19: 3370-3372, (2009).
Worsley, et al., Carbon scaffolds for stiff and highly conductive monolithic oxide—carbon nanotube composites, Chemistry of Materials, 23: 3054-3061, (2011).
Worsley, et al., Synthesis of Graphene Aerogel with high electrical conductivity, JACS Communications, 132: 14067-14069, (2010).
Wu, et al., "Graphene anchored with $Co_3O_4$ nanoparticles as anode of lithium ion batteries with enhanced reversible capacity and cyclic performance", vol. 4, No. 6, 3187-3194, (2010).
Wu, et al., "Synthesis of graphene sheets with high electrical conductivity and good thermal stability by hydrogen arc discharge exfoliation", vol. 3, No. 2, 411-417, (2009).
Xu, et al., "Self-assembled graphene hydrogel via a one-step hydrothermal process", ACSNANO, vol. 4, No. 7, 4324-4330, (2010).
Yin, et al., "Assembly of graphene sheets into 3D macroscopic structures", Small, 8, No. 16, 2458-2463, (2012).
Yoo, et al., "Large reversible Li storage of graphene Nanosheet families for use in rechargeable lithium ion batteries", Nano Letters, vol. 8, No. 8, 2277-2282, (2008).
Zhou, et al., "Graphene-wrapped $Fe_3O_4$ anode material with improved reversible capacity and cyclic stability for lithium ion batteries", Chem. Mater., 22: 5306-5313, (2010).
Zhu, et al., Nanostructures reduced grapheme oxide/$Fe_2O_3$ composite as a high-performance anode material for lithium ion batteries, ACSNANO, vol. 5, No. 4, 3333-3338, (2011).
Zu, et al., "Aqueous dispersion of graphene sheets stabilized by pluronic copolymers: Formation of Supramolecular hydrogel", J. Phys. Cem. C, 113: 13651-13657, (2009).

\* cited by examiner (A)

| Metal oxides | MnO₂ | Fe₂O₃ | Mn₃O₄ | Fe₃O₄ | Co₃O₄ | MoO₂ | NiO | CoO | CuO | V₂O₅ | TiO₂ |
|---|---|---|---|---|---|---|---|---|---|---|---|
| C (mAh/g) | 1231 | 1005 | 935 | 924 | 889 | 837 | 716 | 714 | 673 | 294 | 168 |
| σ @RT* (S/cm) | $10^{-6}$–$10^{-3}$ | ~$10^{-14}$ | | ~$10^{2}$ | $10^{-4}$ | $10^{-4}$ | $10^{-13}$ | $10^{-8}$ | $10^{-2}$ | $4 \times 10^{-7}$ | $10^{-6}$ |
| ρ* (g/cm³) | 5.03 | 5.24 | 4.7 | 5.00–5.40 | 6.07 | 6.47 | 7.45 | 5.70–6.70 | 6.40–6.45 | 3.36 | 3.83 (anatase) |

* Note: Samsonov, G. V., Oxide Handbook, 2nd Edition, New York, 1982.

(B)

| Sample (wt. %) | Pristine Particle Size | Lithiated Particle Size | Recipe for electrode | Thickness | Performance |
|---|---|---|---|---|---|
| α-γ-Fe₂O₃:graphene (5%) | ~15 nm | 49.9 ± 14.6 nm | No carbon additive, no binder | 250 μm | 853 mAh/g @ 100 mA/g after 30 cycles (based on hybrid) |
| α-Fe₂O₃:graphene (40%) | 12.5 ± 3.5 nm | – | No carbon additive, no binder | 250 μm | 1160 mAh/g @ 100 mA/g after 30 cycles (based on hybrid) |
| γ-Fe₂O₃:graphene (35%) | 8.1 ± 1.2 nm | 20.6 ± 7.5 nm | No carbon additive, no binder | 250 μm | 800 mAh/g @ 100 mA/g (based on hybrid) |

FIGURE 7

GRAPHENE-SUPPORTED METAL OXIDE MONOLITH

RELATED APPLICATIONS

This application claims priority to U.S. provisional application Ser. No. 61/745,522 filed Dec. 21, 2012, which is hereby incorporated by reference in its entirety for all purposes.

FEDERAL FUNDING STATEMENT

The United States Government has rights in the invention pursuant to Contract No. DE-AC52-07NA27344 between the U.S. Department of Energy and Lawrence Livermore National Security, LLC, for the operation of Lawrence Livermore National Laboratory.

BACKGROUND

Iron is the fourth most abundant element (~5%) in the Earth's crust and the least expensive among all transition metals (which is ~100 times cheaper than minor metals such as cobalt). In its oxide form, iron oxides (e.g., FeO, $Fe_2O_3$, $Fe_3O_4$) are green materials with little environmental impact and have been investigated as potential anode materials for high-performance lithium-ion batteries, due largely to their attractive specific capacity. $Fe_2O_3$ (alpha-Hematite or gamma-Maghemite), for example, carries a theoretical capacity of 1005 mAh/g that is about ~3 times higher than commercial anode graphite (~372 mAh/g), and is among the highest in various transition metal oxides (e.g., $TiO_2$, $V_2O_5$, $Cr_2O_3$, $Mn_3O_4$, $MoO_2$, $CO_3O_4$, NiO, CuO) (see, for example, FIG. 7). The combined traits of low-cost, nontoxic, corrosion-resistant, and facile synthesis have evidently made $Fe_2O_3$ one of the top candidates as anode materials for lithium-ion batteries. Other metal oxides also are of interest.

Unfortunately, some known hurdles need to be overcome before metal oxides can become the components in lithium-ion batteries, including (1) low electrical conductivity of metal oxides (FIG. 7), which curbs the rate performance; (2) defoliation and pulverization of active materials due to the large volume expansion, leading to capacity fading and low cycle life; and (3) scalability, which is desirable for any synthetic approach in order to have practical applications, as the thickness of commercial battery electrodes is typically ~100-200 μm. Various scientific strategies have hitherto been actively pursued and become a voluminous subject of lithium-ion batteries.

Among various approaches, graphene/metal oxides as anode materials have been under intensive investigations, spurred not only by the high specific capacities of metal oxides (see FIG. 7A), but also by the high electrical conductivity, chemical stability, and mechanical robustness of graphene sheets. To date, a number of composite approaches have been developed, including graphene-anchored, -wrapped, -encapsulated, -layered/sandwiched, or -mixed with metal oxide nanoparticles. Sometimes reduced graphene oxides are used.

Despite high gravimetric energy density and discharge/charge rates often witnessed in some of these composites, most approaches adopt simple dispersion or mixture of graphene with metal oxides, leading to certain shortcomings. First, many strategies only work well when the electrode is very thin. The short diffusion pathway of nanoparticles cannot be taken advantage of when the anode becomes thicker (>100-200 μm for commercial applications), as $Li^+$ has to diffuse through the thickness of the electrode during charge-discharge. This disadvantage inevitably limits commercialization potential. Second, the majority of electrodes are not carbon-black-free or binder-free. Despite the high electrical conductivity of single sheet graphene, carbonaceous species and/or polymeric binders are required in most of these approaches. These extra fillers increase electrode weight but contribute little to the lithium storage, reducing the overall energy density. In addition, carbon additives could cause pseudocapacitive behavior in the low-voltage cycle range that could undermine the role of graphene. Third, the lack of control in microstructure homogeneity and interface structures, which prevents in-depth understanding of graphene/nanoparticle interaction mechanisms. The addition of conductive carbons or polymer binders further clouds such studies.

Because of above reasons, the performance characteristics of many existing graphene/metal oxides cannot easily scale up with the thickness of the electrode. Novel architecture designs are needed in order to solve these and other challenging issues.

SUMMARY

Embodiments provided herein include compositions, devices, and articles, as well as methods of making and methods of using the compositions, devices, and articles.

One embodiment provides, for example, a composition comprising at least one graphene-supported metal oxide monolith, said monolith comprising (i) a three-dimensional network of graphene sheets crosslinked by covalent carbon bonds, and (ii) at least one metal oxide embedded inside said three-dimensional network.

Another embodiment provides a method comprising: providing a graphene aerogel monolith; immersing said graphene aerogel monolith in a solution comprising at least one metal salt to form a mixture; curing said mixture to obtain a gel; optionally, heating said gel to obtain a graphene-supported metal oxide monolith. In one embodiment, the heating step is not optional but carried out.

Another embodiment provides a method, comprising: providing a porous graphene aerogel monolith; and depositing at least one metal oxide within the porous graphene aerogel monolith by atomic layer deposition to obtain a graphene-supported metal oxide monolith.

Another embodiment provides a device comprising at least one graphene-supported metal oxide monolith, said monolith comprising a three-dimensional structure of graphene sheets crosslinked by covalent carbon bonds, wherein the graphene sheets are coated by at least one metal oxide.

At least one advantage for at least one embodiment is described in the following embodiments including, for example, specific capacities which are thickness independent, high surface area, high electrical conductivity, and mechanical robustness, and combinations thereof.

BRIEF SUMMARY OF THE FIGURES

FIG. 7. (A) A summary of theoretical specific capacities (C), electrical conductivities ($\sigma$), and densities ($\rho$) of different transition metal oxides as anode candidates for lithium-ion batteries. The order of metal oxides is sorted according to their specific capacities, from high to low. (B) A summary of information and electrochemical performances of graphene/$Fe_2O_3$, as described herein, as anodes for lithium-ion batteries.

DETAILED DESCRIPTION

Introduction

Figure 1:
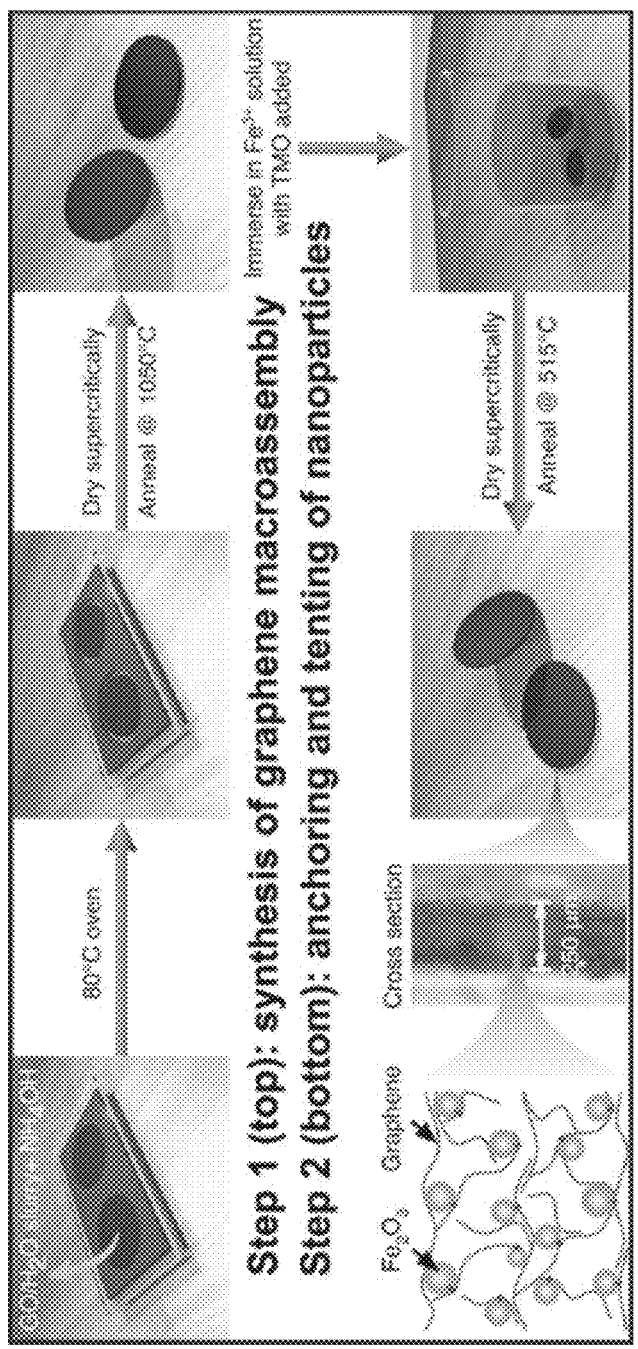
FIG. 1 shows a schematic illustration of the synthetic procedures for 3D graphene macroassembly (GMA)/$Fe_2O_3$ hybrids. Step 1, three-dimensional GMA was fabricated by the reduction of graphene oxides using $NH_4OH$ and supercritically dried and annealed at 1050° C. Step 2, the FeOOH nanoparticles were anchored inside 3D GMA by a sol-gel method, followed by additional supercritically-drying and annealing at 515° C. The lower left drawing shows the graphene-tented $Fe_2O_3$ structure formed by this approach.

References cited herein can be used to practice and better understand the claimed inventions and are incorporated by reference herein in their entireties for all purposes.

Priority U.S. provisional application Ser. No. 61/745,522 filed Dec. 21, 2012 is hereby incorporated by reference in its entirety for all purposes including working examples and claims.

US Patent Publication 2012/0034442 to Worsley et al., "Mechanically Stiff, Electrically Conductive Composites of Polymers and Carbon Nanotubes" is incorporated herein by reference in its entirety.

The article, "Mechanically Robust 3D Graphene Macroassembly with High Surface Area," Worsley et al., *Chem. Commun.*, 2012, 48, 8428-8430, is incorporated herein by reference in its entirety.

The article, "Synthesis of Graphene Aerogel with High Electrical Conductivity," Worsley et al., *J. Am. Chem. Soc.*, 2011, 2, 921-925, is incorporated herein by reference in its entirety.

The article, "High Surface Area, sp2-Cross-Linked Three-Dimensional Graphene Monolith," Worsley et al., *J. Phys. Chem. Letter,* 2010, 132(40), 14067-14069, is incorporated herein by reference in its entirety.

The article, "Advanced Carbon Aerogels for Energy Applications," Biener et al., *Energy & Environmental Science,* 2011, 4, 656-667, is incorporated herein by reference in its entirety.

The article, "Carbon scaffolds for stiff and highly conductive monolithic oxide-carbon nanotube composites," Worsley et al, *Chemistry of Materials,* 2011, 23 (12), 3054, is incorporated herein by reference in its entirety.

Graphene-Supported Metal Oxide Monolith

A graphene-supported metal oxide can be a monolith that is mechanically robust, electrically conductive, and of high-surface area. Monolith is a term known in the art. Monolith and methods for making monolith are disclosed in, for example, U.S. Pat. No. 5,207,814, U.S. Pat. No. 5,885,953, U.S. Pat. No. 5,879,744, U.S. Pat. No. 7,378,188, U.S. Pat. No. 7,410,718, and U.S. Pat. No. 7,811,711.

The graphene-supported metal oxide monolith can comprise, for example, (i) a three-dimensional network of graphene sheets crosslinked by chemical linkage such as covalent carbon-carbon bond, and (ii) at least one metal oxide embedded in said three-dimensional network. The metal oxide can be in particle form or non-particle form.

The graphene-supported metal oxide monolith can have a thickness of, for example, 100 μm or more, or 200 μm or more, or 250 μm or more, or about 100-1000 μm, or about 200-500 μm.

The graphene-supported metal oxide monolith can be, for example, mesoporous. The average pore size can be, for example, less than 100 nm, or less than 50 nm.

The metal oxide can include, for example, one or more of $Fe_2O_3$, $TiO_2$, $MnO_2$, $Mn_3O_4$, $Fe_3O_4$, $Co_3O_4$, $MoO_2$, NiO, CoO, CuO, and $V_2O_5$. Metal oxides can also be used with Mn, Fe, Co, Ni, Cu, Zn, Zr. Also used can be $SnO_2$, $CO_3O_4$, $V_2O_5$, $NiCo_2O_4$, $NiO_2$, $Al_2O_3$ and $SiO_2$. Combinations of metal oxides can be used.

In some embodiments, the metal oxide is selected from $Fe_2O_3$, $TiO_2$, $SnO_2$, $NiO_x$, $NiCo_2O_x$, $CoO_x$, $MnO_x$, $Al_2O_3$, $SiO_2$, and $V_2O_5$.

The metal oxide particle can be, for example, a nanoparticle. The average diameter of the metal oxide particle can be, for example, 1-100 nm, or 2-50 nm, or 5-20 nm. In one particular embodiment, the metal oxide particle is a $Fe_2O_3$ nanoparticle. In another particular embodiment, the metal oxide particle is a $TiO_2$ nanoparticle.

The weight percentage of metal oxide in the graphene-supported metal oxide can be, for example, 5-95%, or 10-90%, or 20-80%, or 30-60%.

The surface area of the graphene-supported metal oxide can be, for example, of 200 m$^2$/g or more, or 500 m$^2$/g or more, or 700 m$^2$/g or more, or 200-1500 m$^2$/g, or 500-1000 m$^2$/g.

In one embodiment, 50% or more, or 70% or more, or 90% or more of the crosslinking covalent bonds of the three-dimensional network of graphene sheets are sp$^2$ bonds.

In one embodiment, the graphene-supported metal oxide monolith is substantially free of graphene sheets interconnected only by physical crosslinks (e.g. Van der Waals forces). In another embodiment, less than 20%, or less than 10%, or less than 5%, or less than 1% of the graphene sheets are interconnected only by physical crosslinks.

In one embodiment, the graphene-supported metal oxide monolith is substantially free of graphene sheets interconnected only by metal crosslinks (e.g., noble metal such as Pd). In another embodiment, less than 20%, or less than 10%, or less than 5%, or less than 1% of the graphene sheets are interconnected only by metal crosslinks.

In one embodiment, the graphene-supported metal oxide monolith is substantial free of graphene sheets with hydroxyl or epoxide functionalities. In another embodiment, 5% or less, or 3% or less, or 1% or less, or 0.5% or less, or 0.1% or less of the carbon atoms in the graphene-supported metal oxide monolith are connected to a hydroxyl or epoxide functionality.

The graphene sheets can be randomly oriented. The graphene sheets can have lateral dimensions of 100 nm or more, 200 nm or more, or 500 nm or more. The surfaces of the graphene sheets can be substantially free of nanoparticles.

In a preferred embodiment, the three-dimensional network of graphene sheets is not made by stacking non-organic material, such as metals, between graphene sheets.

Process for Making Graphene-Supported Metal Oxide Monolith

The graphene-supported metal oxide monolith described herein can be prepared by, for example: (i) providing a graphene aerogel monolith; (ii) immersing said graphene aerogel monolith in a solution comprising at least one metal salt to form a mixture; (iii) curing said mixture to obtain a gel; (iv) optionally, heating said gel to obtain a graphene-supported metal oxide monolith. In one embodiment, the graphene-supported metal oxide monolith was obtained without heating. In one embodiment, the heating step is carried out to obtain the graphene-supported metal oxide monolith.

The fabrication of graphene aerogel monoliths are disclosed in US 2012/0034442 and Worsley et al., *Chem. Commun.,* 2012, 48, 8428-8430, both of which are incorporated herein by reference in its entirety.

The solution for immersing the graphene aerogel can comprise, for example, water and/or at least one organic solvent. The organic solvent can include, for example, an alcohol such as methanol, ethanol, propanol, and the like.

The solution for immersing the graphene aerogel can comprise, for example, at least one initiator for the sol-gel reaction. The initiator can be, for example, propylene oxide, trimethylene oxide, dimethylene oxide, and the like.

The metal salt in the solution can comprise, for example, an iron salt, a titanium salt, a manganese salt, a cobalt salt, a molybdenum salt, a nickel salt, a copper salt, and/or a vanadium salt. In one particular embodiment, the metal salt comprises iron nitrate and/or iron chloride. In another particular embodiment, the metal salt comprise titanium alkoxide.

The concentration of the metal salt in the solution can be, for example, 0.02-10 M, or 0.05-5 M, or 0.1-2M. In addition, the molar ratio of the initiator to the metal salt can be tuned to promote nanoparticle nucleation and anchoring on the surface of graphene sheets. The molar ratio of the initiator to the metal salt can be, for example, 50:1 to 1:1, or 20:1 to 5:1. In a particular embodiment, the metal salt is an iron salt, and the molar ratio of the initiator to the iron salt is about 11:1.

The mixture comprising the graphene aerogel monolith immersed in the solution is subjected to sol-gel reaction. After gelation, the gel is heated to crystallize the metal oxide particle. The gel can be heated at, for example, 200° C. or more, or 250° C. or more, or 300° C. or more, or 350° C. or more, or 400° C. or more, or 450° C. or more, or 500° C. or more, or about 200-800° C., or about 300-600° C. The gel can be heated for, for example, 1-10 hours, or 2-8 hours, or 3-6 hours.

The graphene aerogel monolith can be prepared by, for example: (i) preparing a reaction mixture comprising a graphene precursor suspension and at least one catalyst; (ii) curing the reaction mixture to produce a wet gel; (iii) drying the wet gel to produce a dry gel; and (iv) pyrolyzing the dry gel to produce the graphene aerogel.

Precursors to graphene are known in the art. For example, graphene oxide is a general term for oxidized graphene, which can be a precursor to graphene. Closely related precursors can include, for example, graphite oxide, single layer graphene oxide, exfoliated graphite, and the like.

In one embodiment, the reaction mixture comprises a graphene oxide (GO) suspension. Methods for making GO are known in the art and disclosed in, for example, Hummer, *J. Am. Chem. Soc.,* 80:1339 (1958), which is incorporated herein by reference in its entirety. In one embodiment, the GO suspension is an aqueous suspension. In another embodiment, the GO suspension is a suspension of at least one organic solvents, such as alcohol, dimethylformamide, tetrahydrofuran, ethylene glycol, N-methylpyrrolidone, etc. In one embodiment, the GO suspension is an aqueous suspension made by sonicating GO in deionized water. The time for sonication can range from 0.5-24 hours. The concentration of GO in the reaction mixture can be 0.1 mg/cc or more, or 1 mg/cc or more, or 2 mg/cc or more, or 5 mg/cc or more, or 10 mg/cc or more.

The reaction mixture may also comprise additional reactant known for sol gel reactions, though it is may not be necessary for gelation. In one embodiment, the reaction mixture comprises resorcinol-formaldehyde (RF), phloroglucinol-formaldehyde, phenol-formaldehyde, cresol-formaldehyde, or phenol-furfuryl alcohol. In one embodiment, the reaction mixture is free of RF. In another embodiment, the reaction mixture comprises RF. In a preferred embodiment, the GO-to-RF ratio is 0.1 or more.

The reaction mixture also can comprise at least one sol gel catalyst. In one embodiment, the catalyst is an acid catalyst. In another embodiment, the catalyst is a base catalyst. Catalysts suitable for making graphene aerogels include, but are not limited to, nitric acid, acetic acid, ascorbic acid, hydrochloric acid, sulfuric acid, sodium carbonate, sodium hydroxide, ammonium hydroxide, and calcium sulfate. The reactant-to-catalyst ratio may range from 10 to greater than 1000.

In one embodiment, the reaction mixture is cured at a temperature of 25-100° C. to produce a wet gel. In another embodiment, the reaction mixture is cured for 4-168 hours at a temperature of 85° C. In a further embodiment, the reaction mixture is cured at atmospheric pressure.

In one embodiment, the wet gel is subjected to solvent exchange to remove reaction by-products. Suitable solvent include, but are not limited to, DI water. In another embodiment, the wet gel is subjected to solvent exchange to remove water. Suitable solvents include, but are not limited to, acetone.

In one embodiment, the wet gel is dried in a supercritical gas to produce a dry gel. Suitable supercritical gases include, but are not limited to, supercritical $CO_2$. In another embodiment, the wet gel is dried under ambient temperature and pressure for an extended time such as at least 24 hours.

In one embodiment, the dry gel is pyrolyzed in an inert gas to produce a graphene aerogel. Suitable inert gases include, but are not limited to, $N_2$. The drying temperature can be 500° C. or more, or 800° C. or more, or 1000° C. or more.

In one embodiment, a graphene aerogel can be further activated to produce an activated aerogel with increased surface area. In one embodiment, the graphene aerogel is thermally activated in an oxidizing atmosphere. Suitable oxidizing atmospheres include, but are not limited to, $CO_2$. The temperature for the thermal activation can be 900° C. or more, or 1000° C. or more.

In an alternative embodiment, the graphene-supported metal oxide monolith is prepared by: (i) providing a porous graphene aerogel monolith; and (ii) depositing at least one metal oxide within the porous graphene aerogel monolith by atomic layer deposition to obtain a graphene-supported metal oxide monolith.

Devices Comprising Graphene-Supported Metal Oxide

The graphene-supported metal oxide monolith described herein can be used in a variety of devices. For example, it can be used in electrodes, batteries, capacitors, supercapacitors, sensors, actuators, membranes, catalyst supports, and hydrogen storage devices.

In one particular embodiment, the graphene-supported metal oxide monolith described herein is used in a lithium battery electrode. The electrode can be, for example, substantially free of any carbon-black. The electrode can be, for example, substantially free of any carbon additives. The electrode can be, for example, substantially free of any binders, such as polymer binders. The electrode can be, for example, substantially free of metal current collectors. The electrode can have a thickness of, for example, 100 μm or more, or 200 μm or more, or 250 μm or more, or 100-1000 μm, or 200-500 μm.

In additional to the electrode comprising the graphene-supported metal oxide monolith, the device can further comprise, for example, at least one counter electrode, at least one electrolyte, at least one separator, and/or at least one current collector. The electrolyte can be a lithium salt, and the device can be a lithium ion battery.

Where the metal oxide is $Fe_2O_3$, the lithium ion battery can have a discharge capacity of, for example, at least 500 mAh/g, or at least 800 mAh/g, or at least 1000 mAh/g at 100 mA/g after 30 cycles. The lithium ion battery can have a reversible capacity of, for example, at least at least 500 mAh/g, or at least 700 mAh/g, or at least 900 mAh/g at 141 mA/g (0.14C). The lithium ion battery can have a reversible capacity of, for example, at least at least 400 mAh/g, or at least 500 mAh/g, or at least 600 mAh/g at 503 mA/g (0.5C).

Where the metal oxide is $TiO_2$, the lithium ion battery can have a reversible capacity of, for example, at least at least 50 mAh/g, or at least 100 mAh/g, or at least 200 mAh/g at 168 mA/g (1C). Long-term cycle stability testing can show longer life. Fast charging can be also achieved.

Graphene Monolith Comprising Lithiated Metal Oxide

Further embodiments of the monolith described herein comprises (i) at least one graphene-based monolith comprising a three-dimensional network of graphene sheets crosslinked by covalent carbon bonds, wherein said three-dimensional network of graphene sheets defines a surface area, (ii) a first region on said surface area comprising at least one lithiated metal oxide, wherein the first region is not covered by SEI, and (iii) a second region on said surface area covered by SEI.

The surface area covered by the first region can be, for example, at least 10%, or at least 20%, or at least 30%, or at least 40%. The surface area covered by the second region can be, for example, less than 90%, or less than 80%, or least than 70%, or less than 60%, or less than 50.

In some embodiments, the metal oxide is selected from $Fe_2O_3$, $TiO_2$, $SnO_2$, $NiO_x$, $NiCo_2O_x$, $CoO_x$, $MnO_x$, $Al_2O_3$, $SiO_2$, and $V_2O_5$.

Additional embodiments are provided in the following non-limiting working examples.

WORKING EXAMPLES

Additional embodiments are also provided in the following non-limiting working examples. For example, graphene-supported metal oxide monoliths were prepared and characterized.

Example 1

Iron Oxide/Graphene Monolith

Material Synthesis

Thick (~250 μm), carbon-black- and binder-free, nanoporous graphene/$Fe_2O_3$ hybrids were synthesized through a chemical sol-gel method. In contrast to previous approaches (and in order to achieve thick and binder free electrodes), the synthetic strategy began with a novel 3-dimensional (3D) graphene macroassembly (GMA) scaffold, FIG. 1 (Step 1), using the method reported in Worsley et al., Chem. Commun. 2012, 48 (67), 8428-8430. The as-synthesized GMA has a thickness of ~250 μm, a density of ~70 mg/cm$^3$, a very high surface area up to ~1500 m$^2$/g, high electrical conductivity (~2 S/cm), and nanometer-sized open porous distributions, a bulk part of which is smaller than 10 nm. Both the density and surface area of the GMA are higher than most 3D graphene assemblies reported in the literature (see Chen et al., Nature Mater. 2011, 10 (6), 424-428). The GMA is also mechanically robust, with a high compressive failure strain of 80-100%, making it suitable for electrode applications.

After GMA synthesis, the 3D GMA was immersed in an ethanolic solution of Fe (III) salt (e.g. iron nitrate, iron chloride) to which an initiator (e.g. propylene oxide, trim-ethylene oxide) was added (i.e., Step 2 in FIG. 1) (see Gash et al., Chem. Mater. 2003, 15 (17), 3268-3275). Iron salt concentrations ranged from 0.175 to 1.4 M. As previously reported (Worsley et al., Chem. Mater. 2011, 23 (12), 3054-3061; Worsley et al., J. Mater. Chem. 2009, 19 (31), 5503-5506), preferential nucleation of the nanoparticles on high surface area carbon can be achieved when the sol-gel chemistry is appropriately tuned. In this case, the molar ratio of initiator-to-Fe was set to 11:1 in order to promote nanoparticle nucleation and anchoring of FeOOH nanoparticles on the surface of graphene sheets, instead of in solution. After the particles were formed, the coated assembly was fired at 515° C. under nitrogen for 3 hours to convert FeOOH to $Fe_2O_3$.

Characterization and Analysis

Figure 2:
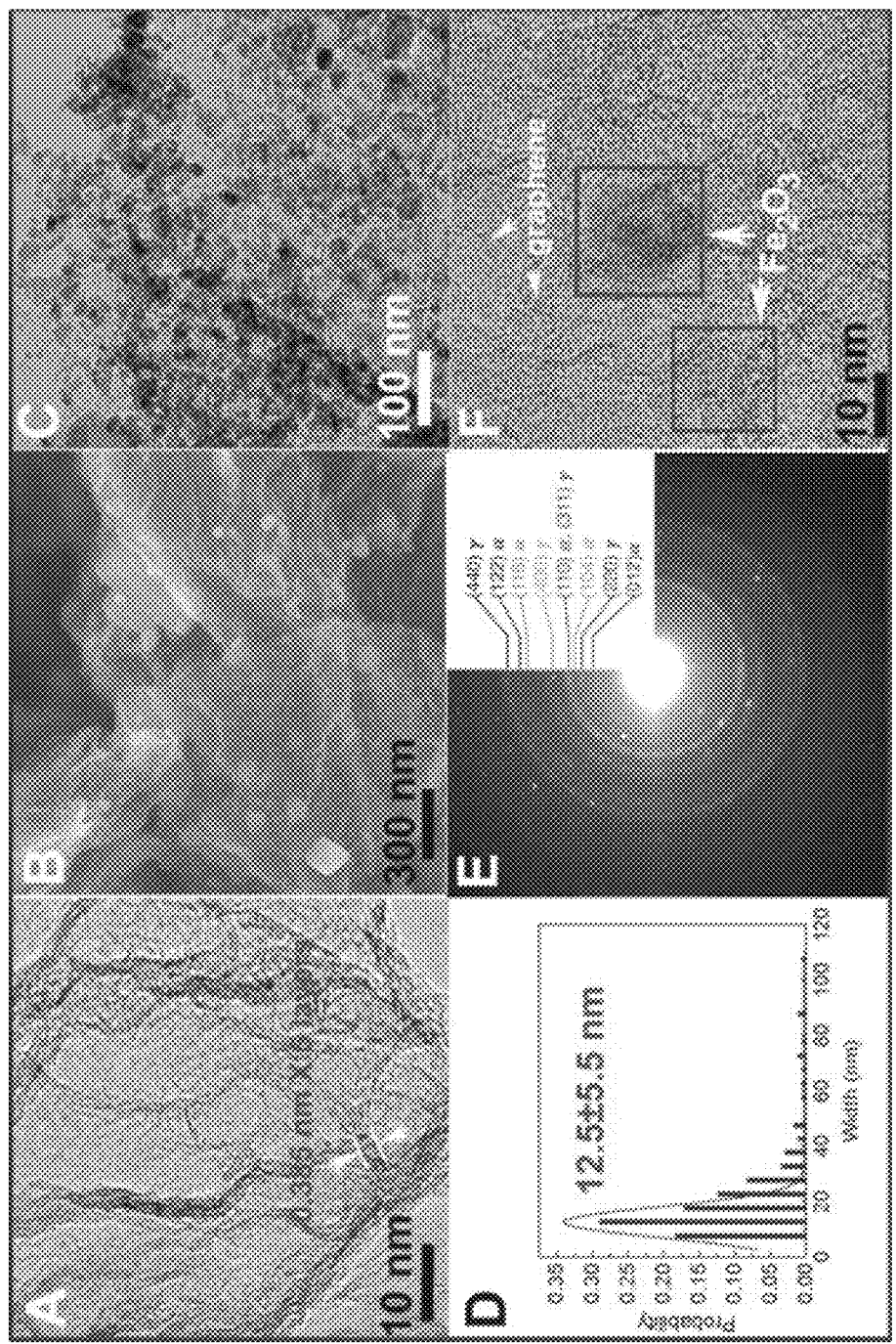
FIG. 2 shows microstructures of the as-synthesized graphene macroassembly (GMA) and graphene/$Fe_2O_3$ hybrids. (A) A TEM image of GMA. (B) and (C), SEM and TEM images of graphene/$Fe_2O_3$ hybrids, respectively. (D) Particle size distribution histogram of $Fe_2O_3$, as measured from a total count of 169 nanoparticles using a series of TEM images similar to the one shown in (C). (E) The selected area diffraction pattern of the graphene/$Fe_2O_3$. The camera length is 520 mm. (F) A high-resolution TEM image of graphene/$Fe_2O_3$, with $Fe_2O_3$ nanoparticles highlighted inside squares.
Figure 12:
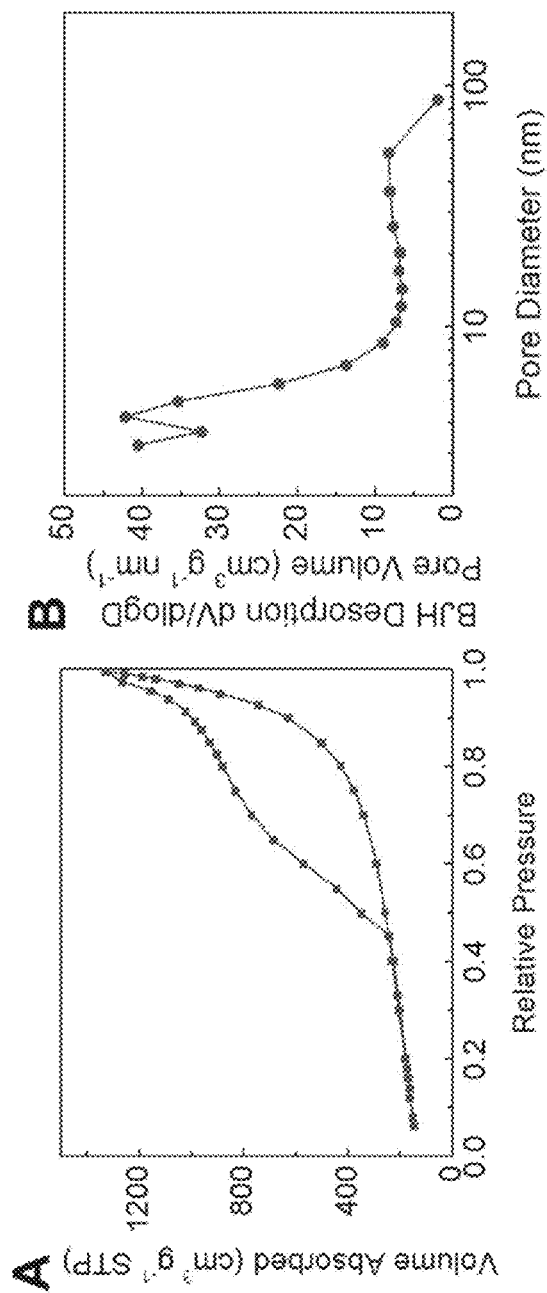
FIG. 12. (A) Nitrogen adsorption/desorption isotherms and (B) pore size distribution for graphene/$Fe_2O_3$ hybrids.

The microstructures of the as-synthesized pure GMA and graphene/$Fe_2O_3$ hybrids are exhibited in FIG. 2. For pure GMA, a transmission electron microscopic (TEM) image shown in FIG. 2A indicates that it is mostly comprised of single-layer graphene sheets; but stacked layers are visible with a measurable interlayer spacing of ~0.385 nm. Raman spectroscopy characterizations reveals that the as-synthesized 3D GMA has a D/G band ratio of 1.37. After $Fe_2O_3$ deposition, scanning election microscopy (SEM) studies (FIG. 2B) confirmed that nanoparticles uniformly embedded among 3D graphene networks. The existence of $Fe_2O_3$ was further confirmed by Raman spectroscopy, which shows that the as-synthesized 3D GMA has a D/G band ratio of 1.37 (FIG. 12).

At 40% $Fe_2O_3$ weight load, the Brunauer-Emmett-Teller (BET) measurements using nitrogen isothermal adsorption indicate that the hybrid has a specific surface area of ~680 m$^2$/g, which is higher than those reported in the literature (Zhou et al., Chem. Mater. 2010, 22 (18), 5306-5313). In addition, all pores inside the hybrids are smaller than 100 nm, as determined by Barrett-Joyner-Halenda (BJH) method.

Figure 13:
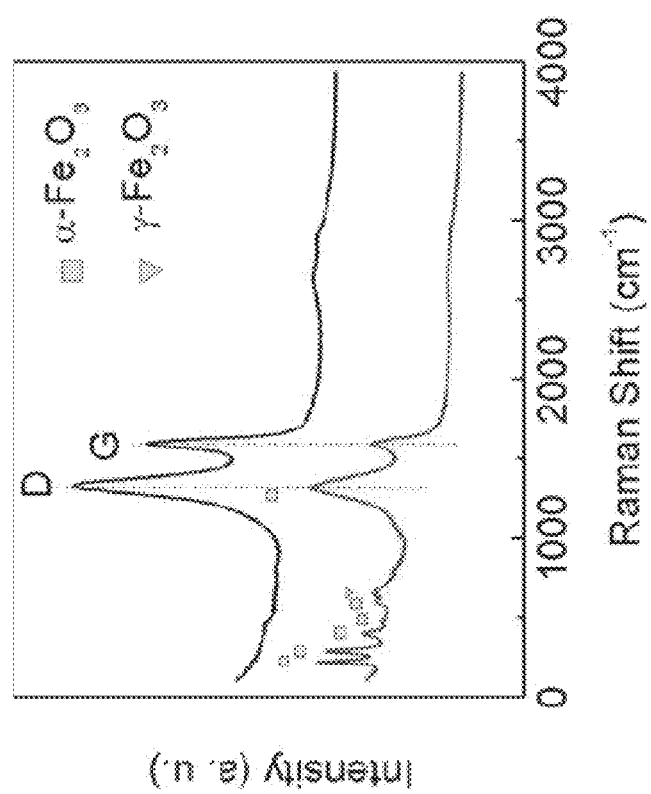
FIG. 13. Raman spectra of the 3D graphene and a graphene/$Fe_2O_3$ hybrid sample (containing both $\alpha$- and $\gamma$-$Fe_2O_3$).

Further, at 56% $Fe_2O_3$ weight load, the BET measurements using nitrogen isothermal adsorption indicate that the hybrid has a specific surface area of ~700 m$^2$/g (FIG. 13A). In addition, the bulk part of open pores inside the hybrids is smaller than 10 nm (FIG. 13B), as determined by BJH method. These open nanopores are expected to not only serve as transport channels for electrolyte, but also offer ample room for the volume expansion of metal oxides during the lithiation. As such, these nanoporous structures are one of the key reasons why our electrodes can be ultrathick.

Figure 14:
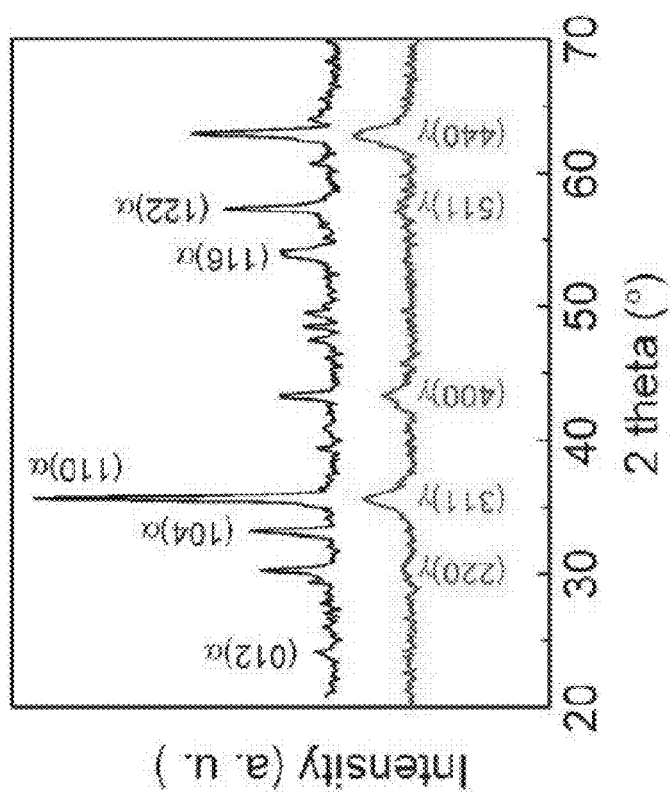
FIG. 14. XRD patterns of two representative graphene/$Fe_2O_3$ samples. One contains $\alpha$- and $\gamma$-$Fe_2O_3$ phases, and the other has 100% $\gamma$-$Fe_2O_3$.

The representative TEM image in FIG. 2C illustrates that the sizes of most $Fe_2O_3$ nanoparticles are well below 50 nm, as can be better revealed in the statistical particle distribution histogram (FIG. 2D), which indicates an average particle size of ~12.5±5.5 nm. The nanoporous characteristics of GMA are also clearly visible under TEM. The selected area diffraction (SAD) pattern from TEM in FIG. 2E shows a mixture phase of α- and γ-$Fe_2O_3$, consistent with the x-ray diffraction results (FIG. 14). The high-resolution TEM investigations, one example of which is shown in FIG. 2F, indicate the good crystalline quality of as-synthesized nanoparticles and tented nature of $Fe_2O_3$ with most edges of the nanoparticles in tight bond with graphene sheets. These graphene-tented structures not only offer great electron pathway to the nanoparticles during lithiation-delithiation processes, but also allow easy volume expansion and contraction for $Fe_2O_3$ nanoparticles without having to break electrical contacts.

Electrochemical Performance of Graphene/$Fe_2O_3$-40 wt. % Loading

Figure 3:
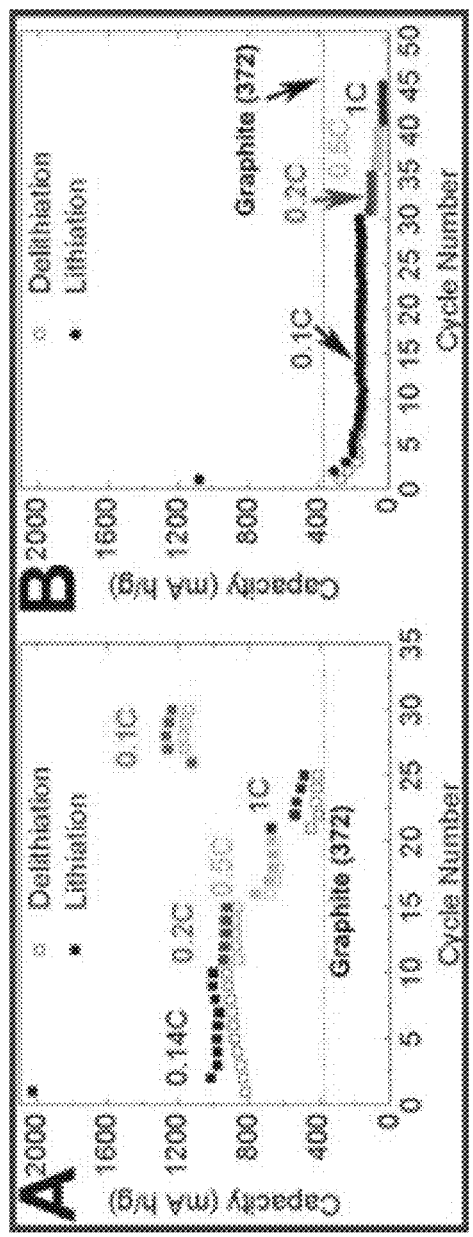
FIG. 3 shows specific capacity, rate performance, and cycle stability of graphene/$Fe_2O_3$ hybrids. The observed specific capacities of (A) graphene/$Fe_2O_3$, and (B) pure GMA at various discharge/charge current densities.

The electrochemical performance of the graphene/$Fe_2O_3$ as anodes was characterized using a half-cell configuration, with $Fe_2O_3$ weight percentages at 40%. Note that the as-synthesized freestanding films were directly used without any carbon additives, or polymer binders, or metal current collectors. Despite the very large thickness (~250 μm) of the electrodes, graphene/$Fe_2O_3$ hybrids showed excellent electrochemical performance, the cycle stability and rate performance of which are illustrated in FIG. 3A. At a current density of 141 mAh/g (i.e., 0.14C, where C=1005 mAh/g), the graphene/$Fe_2O_3$ sample exhibited a discharge capacity of ~2020 mAh/g (equivalent to 12.1 Li$^+$ uptake per $Fe_2O_3$ molecule based on the total weight) and a charge capacity of ~818 mAh/g at the first cycle. The relatively low charge capacity of the sample in the first cycle is likely due to the poor electrolyte wetting, as the anode did not contain any polymer binders and had ultra-thickness. This is consistent with the lag response of the specific capacity whenever a different discharge/charge rate is applied (see FIG. 3A). As the wetting improved, the charge capacity steadily increased and stabilized after ~10 cycles at ~922 mAh/g. At a higher current density of 503 mAh/g, the sample had a reversible capacity of ~656 mAh/g, which remains well above the theoretical capacity of graphite and is indicative of good rate performance. Significantly, the reversible capacity of graphene/$Fe_2O_3$ retained at a value of ~1166 mAh/g (equivalent to 7.0 $Li^+$ based on the total weight) at a current density of 100 mAh/g after 30 cycles. These results demonstrated excellent cycle stability of the graphene/$Fe_2O_3$ hybrids. Since $Fe_2O_3$ has a theoretical $Li^+$ intake of 6 per molecule, the additional reversible capacity (i.e., 1.0 $Li^+$ at 100 mAh/g) observed in the hybrids may be related to the formation of reversible organic gel-like films (Larcher et al., *J. Electrochem. Soc.* 2003, 150 (12), A1643-A1650) and/or $Li^+$ insertion/intercalation into graphene defect sites or interlayers. Notably, the initial uptake of 12.1 $Li^+$ per $Fe_2O_3$ molecule is higher than all previously reported values, including graphene/$Fe_2O_3$ and nanosized $Fe_2O_3$ particles with values of 10.1, 8.8, and 8.6 $Li^+$ uptake reported previously (Larcher et al., *J. Electrochem. Soc.* 2003, 150 (12), A1643-A1650; Morales et al., *J. Electrochem. Soc.* 2005, 152 (9), A1748-A1754). Such a large $Li^+$ uptake may be related to the pseudocapacitive behavior typically associated with large surface area electrodes (Zhu et al., *ACS Nano* 2011, 5 (4), 3333-3338; Larcher et al., *J. Electrochem. Soc.* 2003, 150 (12), A1643-A1650). Despite the very large thickness of electrodes used in the experiments and the lack of carbon additives and binders, the reversible capacity of the graphene/$Fe_2O_3$ hybrids at low current density (~100 mAh/g) is higher than other graphene-based hybrids, whereas at higher cycle rates (>503 mAh/g) it is only slightly lower those reported in the literature (Zhu et al., *ACS Nano* 2011, 5 (4), 3333-3338; Zhou et al., *Chem. Mater.* 2010, 22 (18), 5306-5313). These informative experimental results demonstrate the good rate performance, high cycle stability, and high specific capacities of the graphene/$Fe_2O_3$ hybrids.

By comparison, the pure GMA samples (~250 μm thick, also without polymeric binders or carbon-black) showed unimpressive cycle stability and low capacity, FIG. 3B. At a current density of 100 mAh/g, the first discharge capacity of GMA achieved a high value of 1077 mAh/g; but decreased to 270 mAh/g in the following charge process. The Coulombic efficiency of the first cycle was ~25%. The discharge capacity in the second cycle decreased to 310 mAh/g, which became stabilized at the level of ~148 mAh/g after 10 cycles. The reversible capacity seen in the GMA was substantially lower than the theoretical capacity of graphite (~372 mAh/g). At a higher current density (>503 mAh/g), pure GMA sample exhibited a capacity that is below ~60 mAh/g. The unimpressive reversible capacity and poor rate-performance observed in GMA are in stark contrast to the large and impressive capacity obtained by 3D graphene/$Fe_2O_3$ electrodes. This underscores a strong synergistic effect between $Fe_2O_3$ nanoparticles and graphene.

Figure 4:
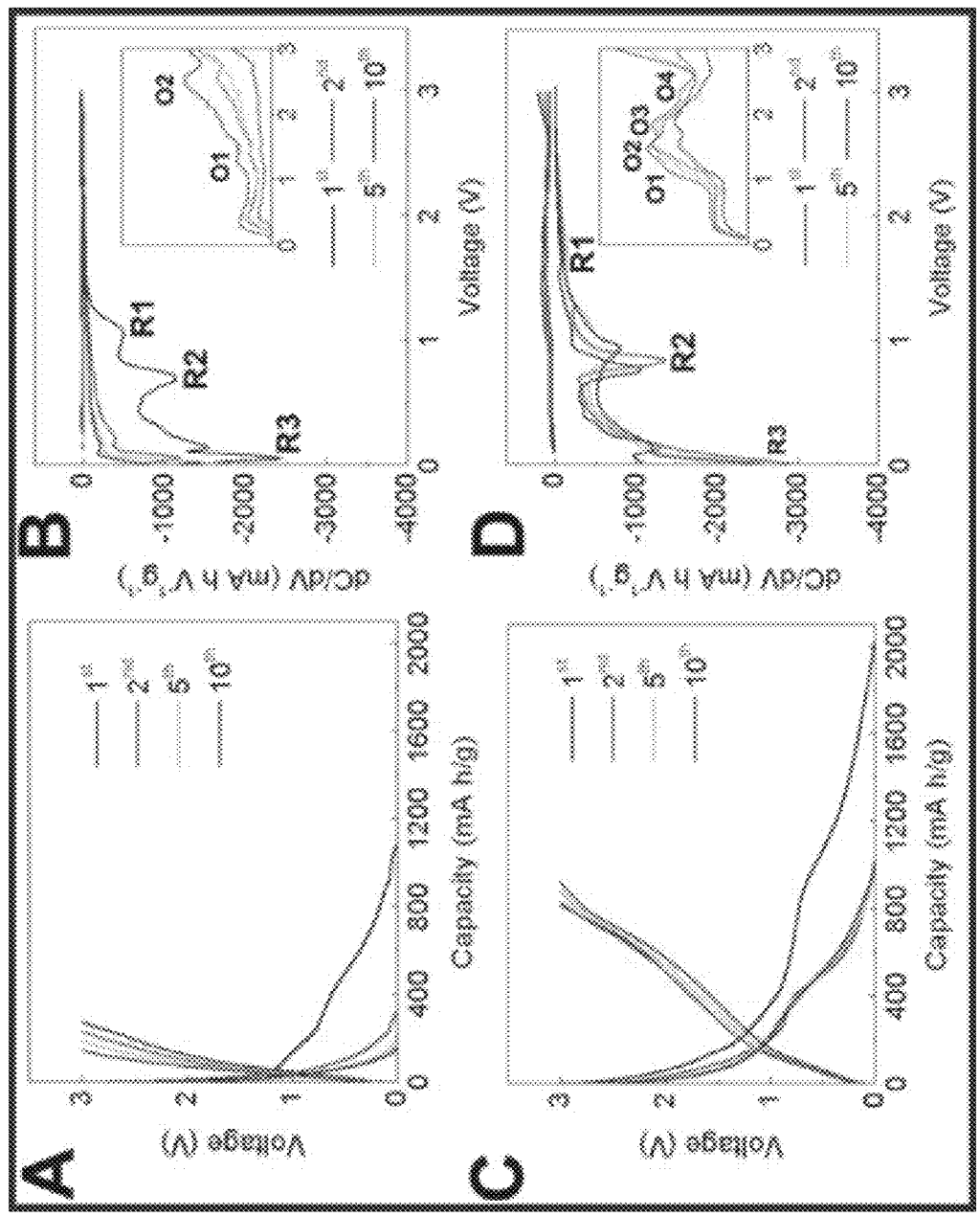
FIG. 4 shows selected discharge/charge cycles for (A) pure GMA and (C) graphene/$Fe_2O_3$, and their corresponding differential capacity curves, (B) and (D), respectively.

To study the mechanistic processes occurring in pure GMA and the hybrids, FIG. 4 shows the discharge/charge curves of several selected cycles at a current density of 100 mAh/g and their corresponding differential capacity curves for GMA (FIGS. 4A and B) and graphene/$Fe_2O_3$ hybrids (FIGS. 4C and D), respectively. During the first discharge of the GMA, the voltage profile showed three reduction peaks at 1.07 V, 0.69 V and <0.5 V (FIG. 4B), the origin of which could be related to the $Li^+$ insertion into graphene defects/edges and/or the decomposition of electrolyte and/or the formation of SEI. In the following cycles, however, two high-voltage peaks disappeared, suggesting a nonreversible process associated with these peaks. The last plateau associated with <0.5V remained after 10 cycles and thus may represent reversible lithium uptake by GMA. Correspondingly, the two oxidation peaks for pure GMA also disappeared with increasing cycles (inset of FIG. 4B).

For the graphene/$Fe_2O_3$ sample, FIG. 4D, three main reduction-peaks were identified: 1) the weak peaks around ~1.6 V, which has been attributed to the intercalation of $Li^+$ into $Fe_2O_3$; 2) the strong peaks at 0.6 V-1.0 V, likely due to the conversion reaction (i.e., the iron reduction from $Fe^{3+}$ to $Fe^0$:

$$Fe_2O_3 + 6Li^+ + 6e^- \rightleftharpoons 2Fe + 3Li_2O \quad (I);$$

and 3) the peaks below 0.5V, which could be related to the formation of organic gel-like films or $Li^+$ insertion into GMA. During the charge process, the hybrid sample displayed four oxidation peaks at 1.2V, 1.5V, 1.8V, and 2.4V. While the middle two peaks (i.e., $O_2$ and $O_3$) have been attributed to the step oxidations of iron from $Fe^0$ to $Fe^{3+}$ by lithium exaction, the first ($O_1$) and last ($O_4$) peaks are likely linked to GMA as their positions are similar to the oxidation peaks of the pure graphene samples. Unlike GMA, however, these two oxidation peaks in the hybrids remained observable even after 10 cycles; i.e., they became reversible due to the presence of $Fe_2O_3$/Fe nanoparticles—an intriguing phenomenon that might be linked to the catalytic ability of nanosized $Fe_2O_3$/Fe particles, as the oxidation peaks were also observed to shift downward compared to those of pure GMA, indicative of easier delithiation processes for graphene inside the hybrids. Although the potential catalytic activities of metal nanoparticles in promoting the decomposition of electrolyte and the formation of gel-like films were suggested previously (Zhou et al., *Chem. Mater.* 2010, 22 (18), 5306-5313; Morales et al., *J. Electrochem. Soc.* 2005, 152 (9), A1748-A1754), it has not been reported that such catalytic activities may also help lithium ion interactions with graphene. This hypothesis is based largely on the earlier experimental documentations that gel-like films can only offer pseudocapacitive behavior that is not consistent with the reappearance of the oxidation peaks for graphene in the synthesized graphene/$Fe_2O_3$ materials.

Electrochemical Performance of Graphene/$Fe_2O_3$-56 wt. % Loading

The electrochemical performance of several graphene/Fe2O3 samples (with $Fe_2O_3$ load ratio of 456 wt. %) as anodes is investigated using a half-cell configuration. Note that in all the cases, the as-synthesized freestanding films are directly used without any carbon additives, or polymer binders, or metal current collectors. Despite the very large thickness (~250 μm) of our electrodes, graphene/$Fe_2O_3$ hybrids (56 wt. % $Fe_2O_3$) show excellent electrochemical performance, with the cycling stability and rate capability illustrated in FIG. 23A. At a current density of 141 mA/g (i.e., 0.14C if normalized against the $Fe_2O_3$ capacity of 1C=1005 mAh/g), the graphene/$Fe_2O_3$ sample exhibits a discharge capacity of ~1633 mAh/g (based on the total weight of the electrode) and a charge capacity of ~796 mAh/g at the first cycle. Since $Fe_2O_3$ has a theoretical $Li^+$ intake of 6 per molecule, the large initial uptake of $Li^+$ observed in the graphene/$Fe_2O_3$ may be related to $Li^+$ binding to graphene surface sites (including structural defects and impurity such as residual oxygen), $Li^+$ intercalation into graphene layers, the formation of organic gellike films (Laruelle et al., *J. Electrochem. Soc.* 2002, 149 (5), A627-A634), and/or other irreversible products such as the solid electrolyte interphase (SEI) (Arora et al., *J. Electrochem. Soc.* 1998, 145 (10), 3647-3667).

Despite the lack of binders and the very large thickness, we note that the reversible capacity of our electrodes stabilizes in less than 5 cycles at 790 mAh/g, demonstrating the excellent wetting ability of our materials. This is in contrast with some dense films reported in the literature (Wang et al., ACS Nano 2010, 4 (3), 15871595). At a higher current density of 503 mA/g, the reversible capacity decreases to ~544 mAh/g, which, however, remains well above the theoretical capacity of graphite (~372 mAh/g) and is indicative of good rate performance. Significantly, the reversible capacity of graphene/$Fe_2O_3$ stabilizes at a value of ~853 mAh/g at a current density of 100 mA/g after 30 cycles. Among several representative samples we have investigated so far (FIG. 7B), importantly, the reversible capacity of our materials at the low current density (~100 mA/g) after 30 cycles either exceeds or is on par with those reported from other graphene/iron oxides (Zhu et al., ACS Nano 2011, 5 (4), 3333-3338; Zhou et al., Chem. Mater. 2010, 22 (18), 5306-5313), and even stays at comparably high levels at higher current densities (>503 mA/g). These informative experiments demonstrate the good rate performance, excellent cycling stability, and high specific capacities of our materials.

Figure 23:
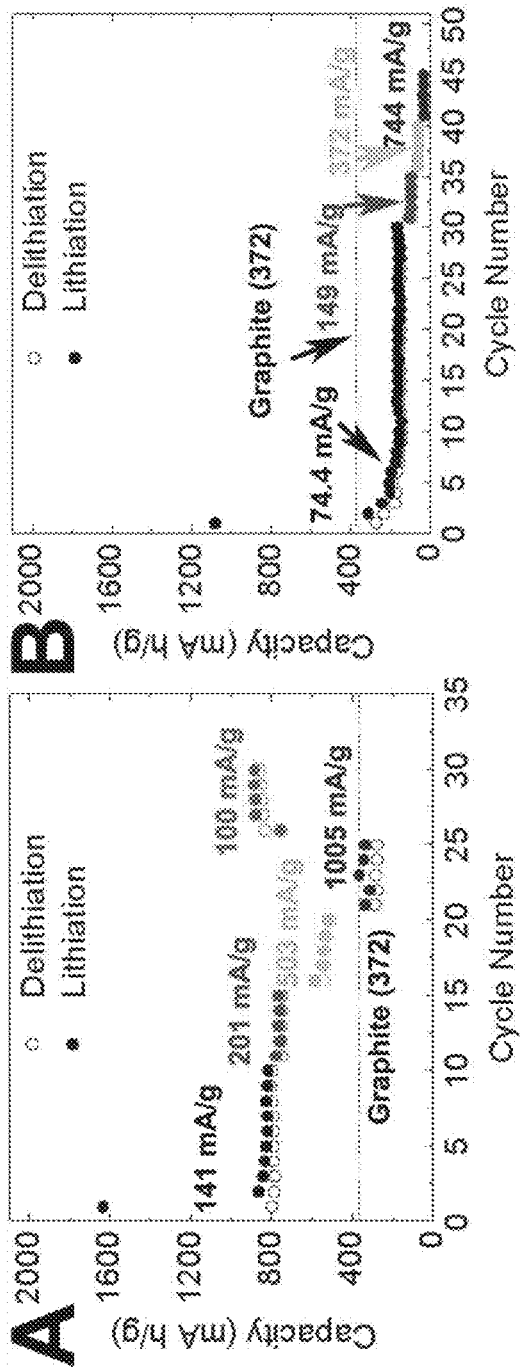
FIG. 23 shows specific capacity, rate performance, and cycle stability of graphene/$Fe_2O_3$ hybrids. The observed specific capacities of (A) graphene/$Fe_2O_3$, and (B) pure GMA at various discharge/charge current densities.

In comparison, the pure GMA samples (~250 μm thick, also without polymer binders or carbon-black) show severe capacity fading and low reversible capacity, FIG. 23B. At a current density of 74.4 mA/g, the first discharge capacity of GMA achieves a high value of 1077 mAh/g; but plunges sharply to 270 mAh/g in the following charge process. The discharge capacity decreases to 310 mAh/g in the second cycle, and stabilizes at ~148 mAh/g after 10 cycles, which is in fact substantially lower than the theoretical capacity of graphite. At a higher current density (>372 mA/g), the GMA sample exhibits a stable capacity below ~60 mAh/g. Such a low reversible capacity and poor rate performance observed in GMA are in stark contrast to the large and impressive capacity obtained in 3D graphene/$Fe_2O_3$ electrodes. This underscores the strong synergistic interplays between $Fe_2O_3$ nanoparticles and graphene.

Figure 24:
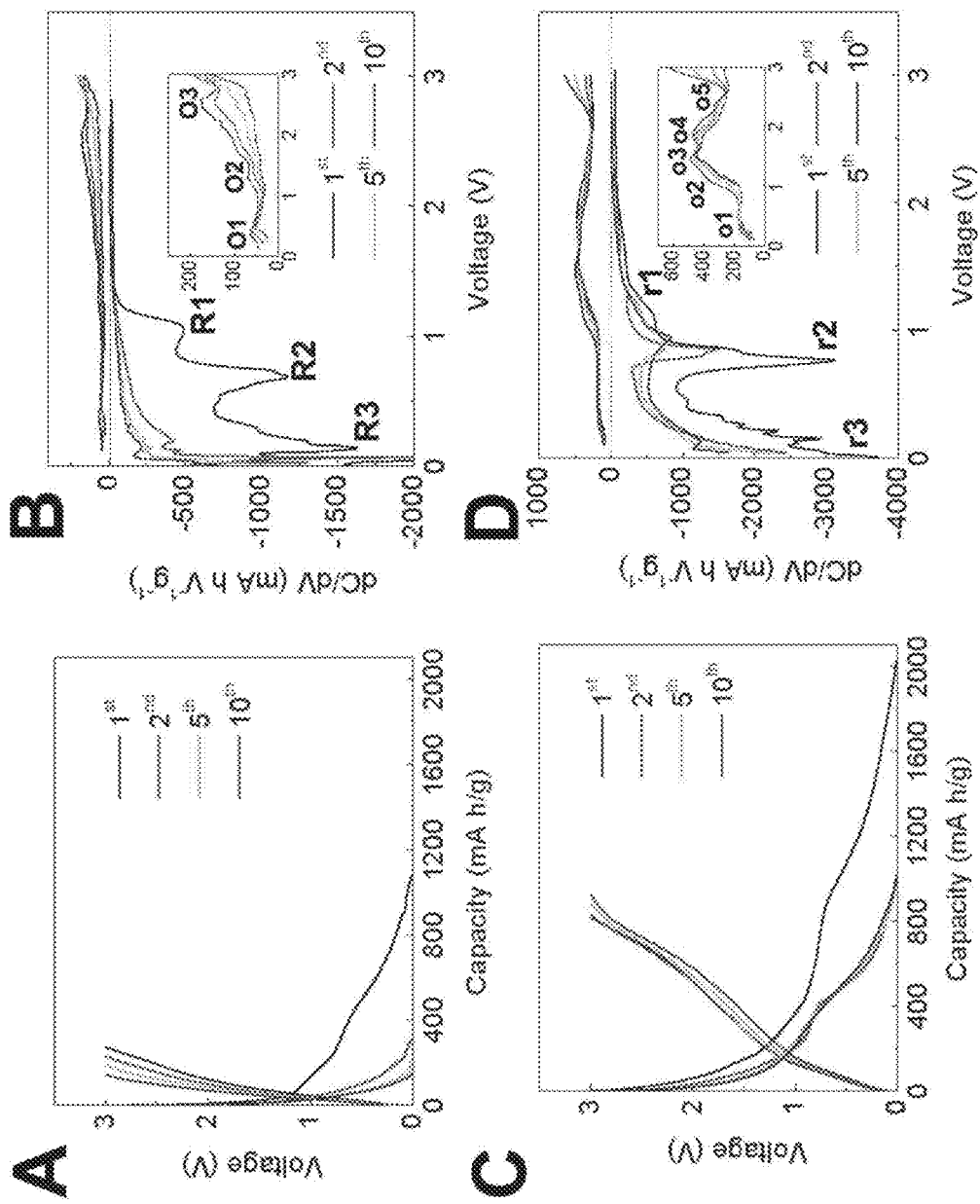
FIG. 24 shows selected discharge/charge cycles for (A) pure GMA and (C) graphene/$Fe_2O_3$, and their corresponding differential capacity curves, (B) and (D), respectively.

To survey the mechanistic processes occurring in pure GMA and the hybrids, FIG. 24 shows the charge/discharge curves of several selected cycles at a current density of 100 mA/g and their corresponding differential capacity curves for GMA (FIGS. 24A and 24B) and graphene/$Fe_2O_3$ hybrids (FIGS. 24C and 24D), respectively. During the first discharge of the GMA, the voltage profile in the differential capacity curves shows three reduction peaks at 1.07 V (R1), 0.69 V (R2) and <0.5 V (R3), FIG. 24B. The origin of these peaks is currently not well understood; but might be related to the $Li^+$ binding with graphene defects/edges and/or the decomposition of electrolyte and/or the formation of SEI. In the following cycles, however, two highervoltage reduction peaks (i.e., R1 and R2) disappear, suggesting a nonreversible process associated with these peaks. The last plateau associated with <0.5 V (R3) and the corresponding oxidation peak (O1) (inset of FIG. 24B) remain present after 10 cycles and thus may represent reversible lithium uptake by GMA. Correspondingly, the two oxidation peaks at higher voltages (i.e., O2 and O3) for pure GMA also disappear with increasing cycles.

Figure 15:
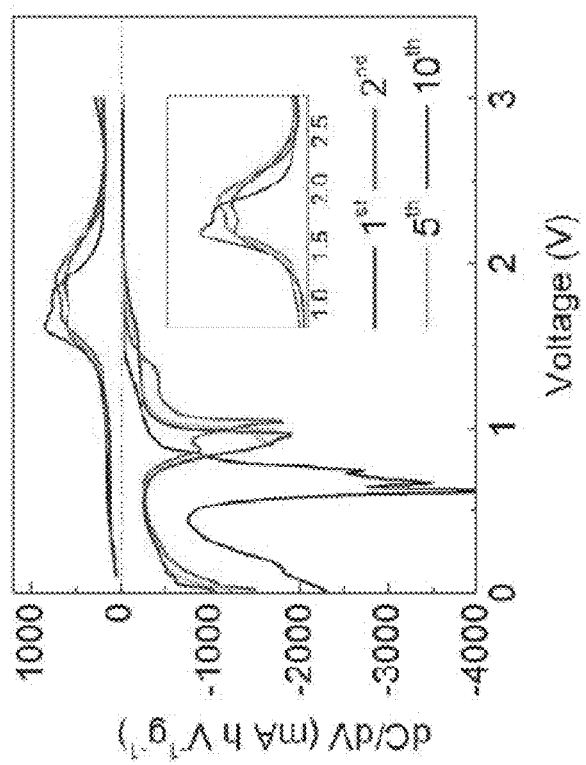
FIG. 15. Differential capacity plots of graphene/($\alpha$+$\gamma$)-$Fe_2O_3$ (56 wt. % Fe2O3). The convoluted nature of the inset oxidation peaks can be seen.

For graphene/$Fe_2O_3$ electrodes, the samples with higher load of $Fe_2O_3$ typically exhibit rather convoluted oxidation peaks that can in principle be separated by proper fitting procedures but are visually challenging to resolve (FIG. 15). For the clarity of presentation, FIG. 24D shows the reduction/oxidation behavior of a sample with 40 wt. % Fe2O3. Three main reduction peaks can be identified: 1) the weak peak around ~1.6 V (R1), which has been attributed to the intercalation of $Li^+$ into $Fe_2O_3$ to form rock salt Lix $Fe_2O_3$ (x=~12); 2) a strong peak at 0.6 V 1.0 V (r2), likely due to the second step of the main conversion reaction:

$$Fe_2O_3 + 6Li^+ + 6e^- \rightleftharpoons 2Fe + 3Li_2O \qquad (I)$$

(i.e., iron reduction from the intermediate compound to $Fe^0$), as well as possible contribution of the R2 peak (in FIG. 24B) from graphene; and 3) the peaks below 0.5V (R3), which could be related to the formation of organic gel-like films, $Li^+$ insertion into GMA, or irreversible SEI formation. During the charging process, the hybrid sample appears to display five oxidation peaks at <0.5 (O1), 1.2V (O2), 1.5V (O3), 1.8V (O4), and 2.4V (O5). While the middle two peaks (i.e., O3 and O4) have been attributed to the two step oxidations of iron from $Fe^0$ to $Fe^{3+}$ by lithium exaction, the other three peaks (O1, O2, O5) are likely linked to the GMA as their positions are close to the oxidation peaks of the pure graphene samples (O1, O2, O3, respectively). Unlike the pure GMA, however, two oxidation peaks (O2 and O5) in the hybrids remain observable even after 10 cycles; i.e., they become more reversible due to the presence of Fe2O3/Fe Nanoparticles—an intriguing phenomenon that has not been reported. We speculate that this may be linked to the volume expansion/contraction of nanoparticles that allows for on-and-off exposure of graphene fresh surface, or related to the catalytic ability of nanosized $Fe_2O_3$/Fe particles. We note that the catalytic behavior of metal nanoparticles in promoting the decomposition of electrolyte and the formation of gel-like films have been suggested by earlier experiments, which archetypically offer pseudocapacitive behavior. It has not been proposed/reported that such catalytic activities may also help redox reactions between lithium ions and graphene (defects or impurities), which could be associated with the recurring oxidation peaks in our samples.

Surface Morphology

Figure 5:
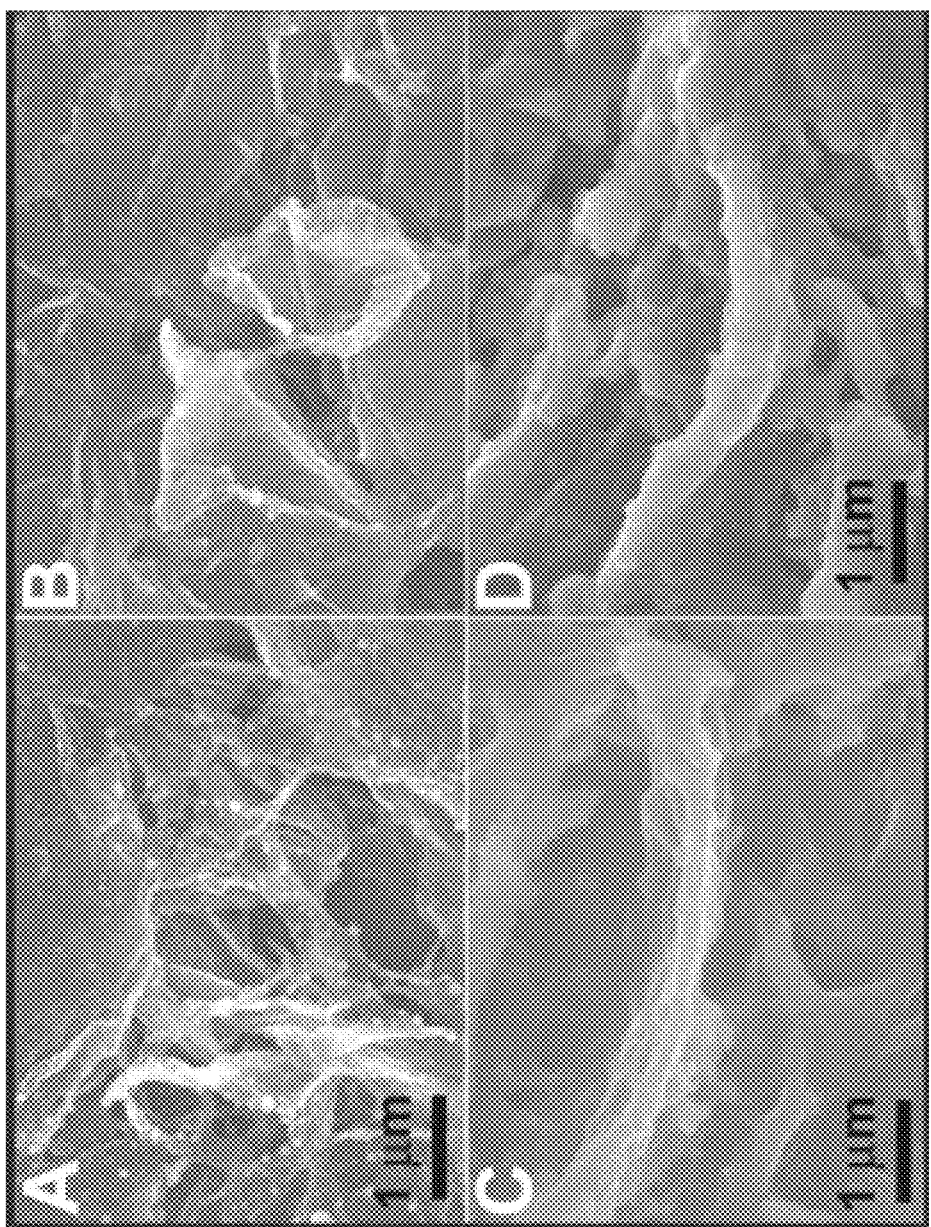
FIG. 5 shows surface morphologies of GMA and graphene/$Fe_2O_3$ after 30 cycles of electrochemical testing. (A) and (B), cross-section SEM images of GMA, and (C) and (D), of graphene/$Fe_2O_3$. Samples in (A) and (C) were charged to 3V, whereas those in (B) and (D) were fully discharged.

The carbon-black- and binder-free nature of the graphene/$Fe_2O_3$ electrodes allows further investigation on the surface morphology evolution details after multiple charge-discharge cycles (30 cycles in all the cases reported here), without the complicated effects of extra fillers. FIGS. 5A and 5B indicate that the surface of GMA was relatively clean and smooth in both delithiated (i.e., FIG. 5A) and lithiated (i.e., FIG. 5B) states. The graphene sheets looked slightly thicker and some small voids appear blocked in FIG. 5B, whereas bubble-like features were visible on the surface of graphene in the delithiated state. These "bubbles" were relatively stable under the electron beam used for imaging, which may be related to the reduction products of electrolyte (such as alkyl carbonates); however, continuous gel-like films were observed on the graphene surface. In contrast, the gel-like films were visible for the graphene/$Fe_2O_3$ sample in the discharged state, FIG. 5C, judged from the rather thick ligaments under SEM. In the charged state, FIG. 5D, it is noticed that much space of the electrode was filled by bulged ligaments, with some voids remaining visible. It is noteworthy to mention that both pure GMA and graphene/$Fe_2O_3$ remained completely intact after 30 cycles, as evidenced by the well-preserved porous structures and ligaments.

Figure 6:
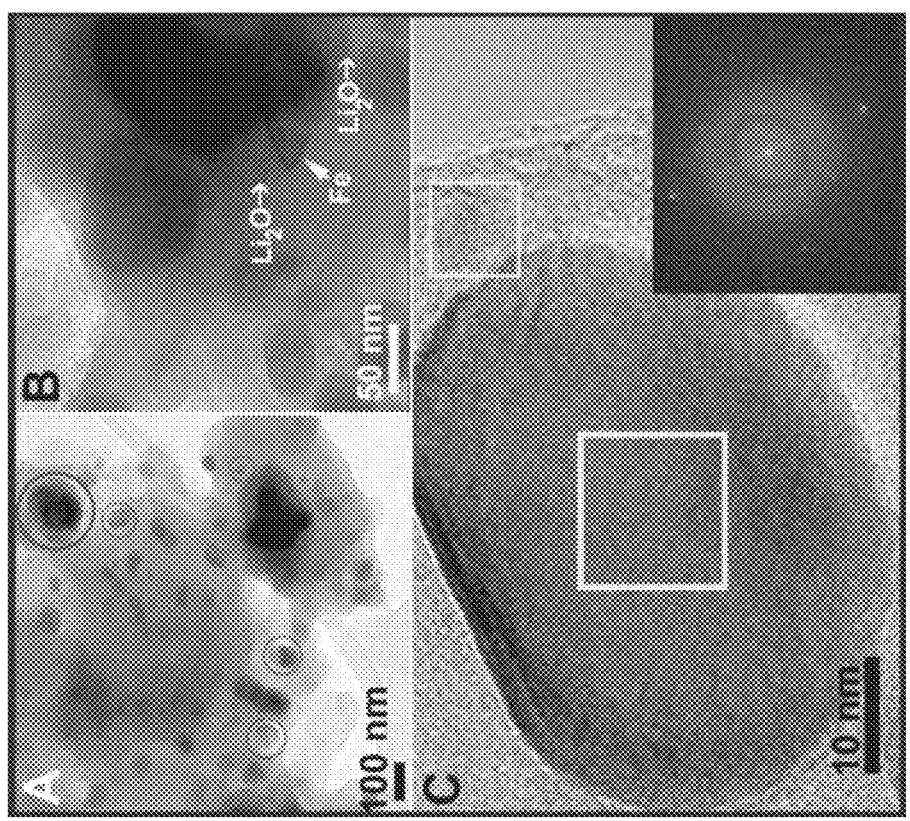
FIG. 6 shows microstructures of graphene/$Fe_2O_3$ after 30 cycles and in the lithiation state. (A) A low-magnification TEM image of graphene/$Fe_2O_3$. Some selected particles with back-and-white contrast are highlighted inside circles. (B) A zoomed-in TEM image of graphene/$Fe_2O_3$ after lithiation. The areas representing $Li_2O$ and Fe nanoparticles are pointed with different white arrows. The size of Fe metal particle is observed smaller than 5 nm, surrounded by semi-amorphous $Li_2O$ phase. (C) A high-resolution TEM image of isolated Fe particles. The inset fast-Fourier transformation (FFT) pattern is obtained from two square areas, which exhibit the same FFT pattern.
Figure 8:
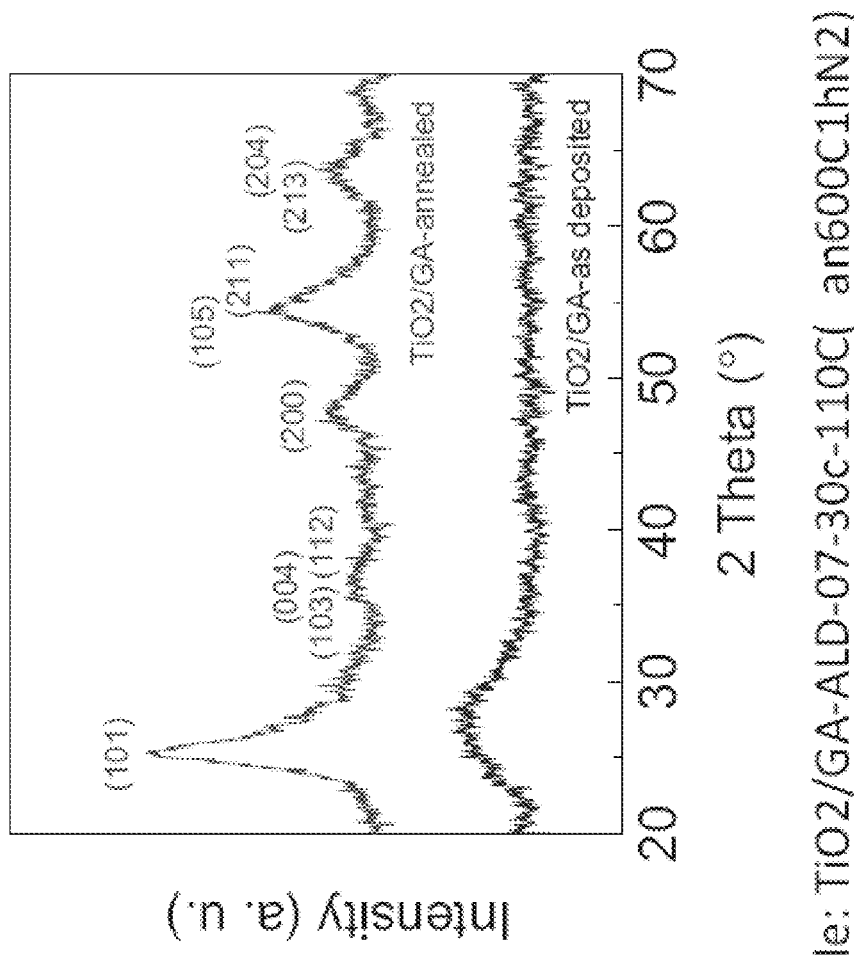
FIG. 8 shows x-ray diffraction data for titanium oxide graphene material. Anatase phase with grain size of ~3 nm was obtained after annealing at 600° C. for 1 hour under $N_2$ flow.
Figure 9:
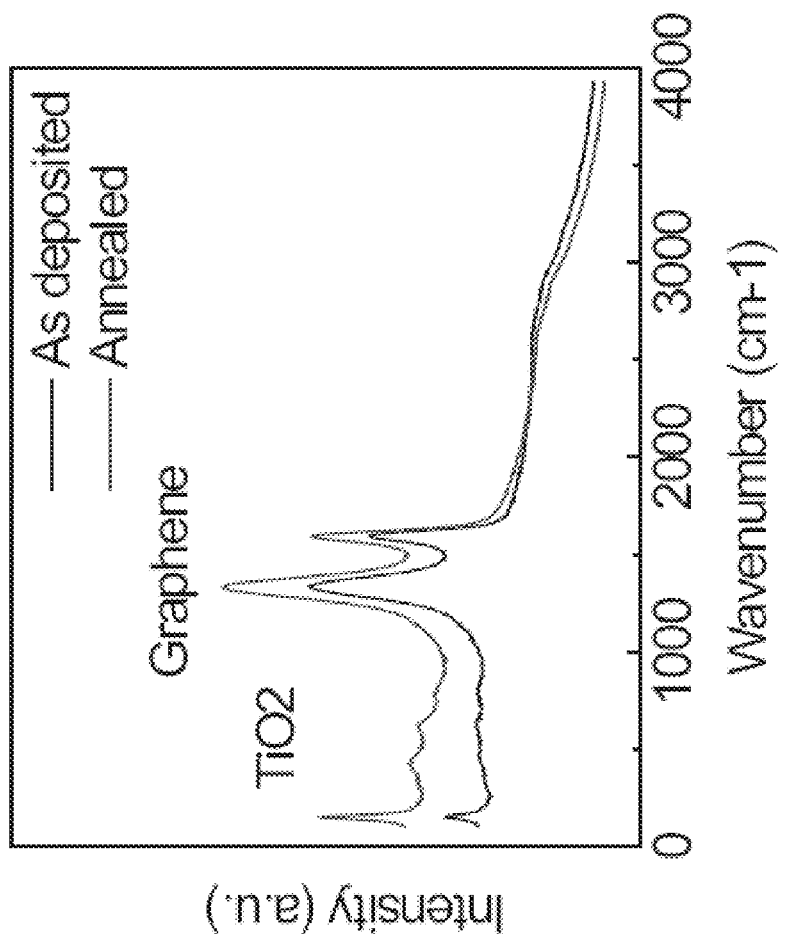
FIG. 9 shows Raman spectra for titanium oxide graphene material. Raman peaks for titania became stronger after annealing at 600° C. for 1 hour under $N_2$ flow.
Figure 10:
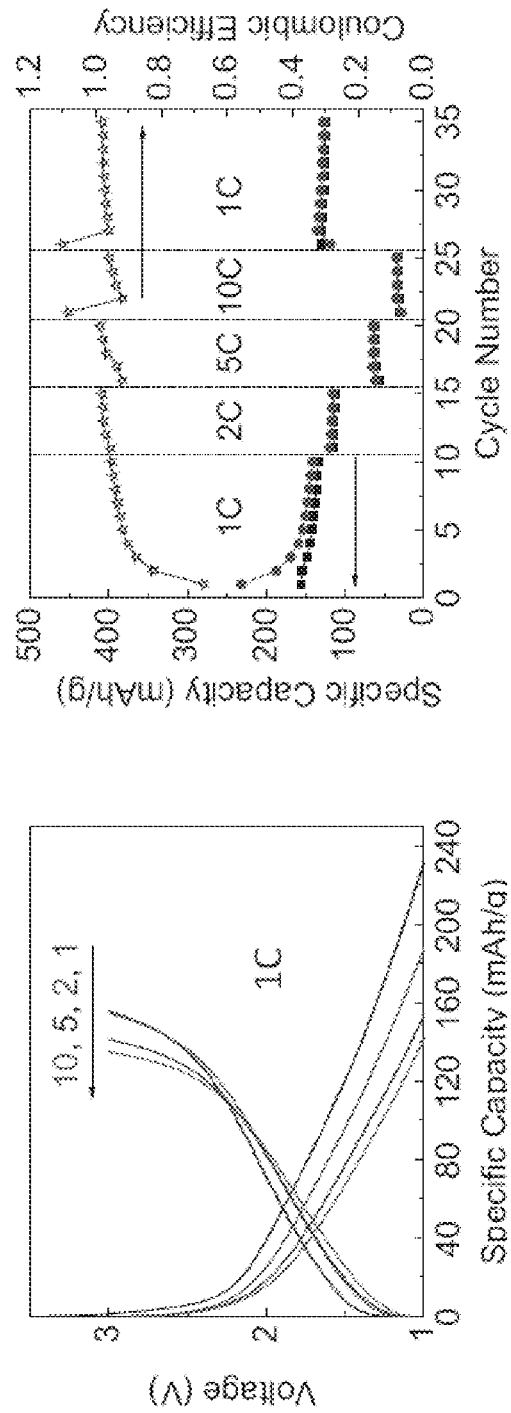
FIG. 10 shows electrochemical measurements for titanium oxide graphene material.
Figure 11:
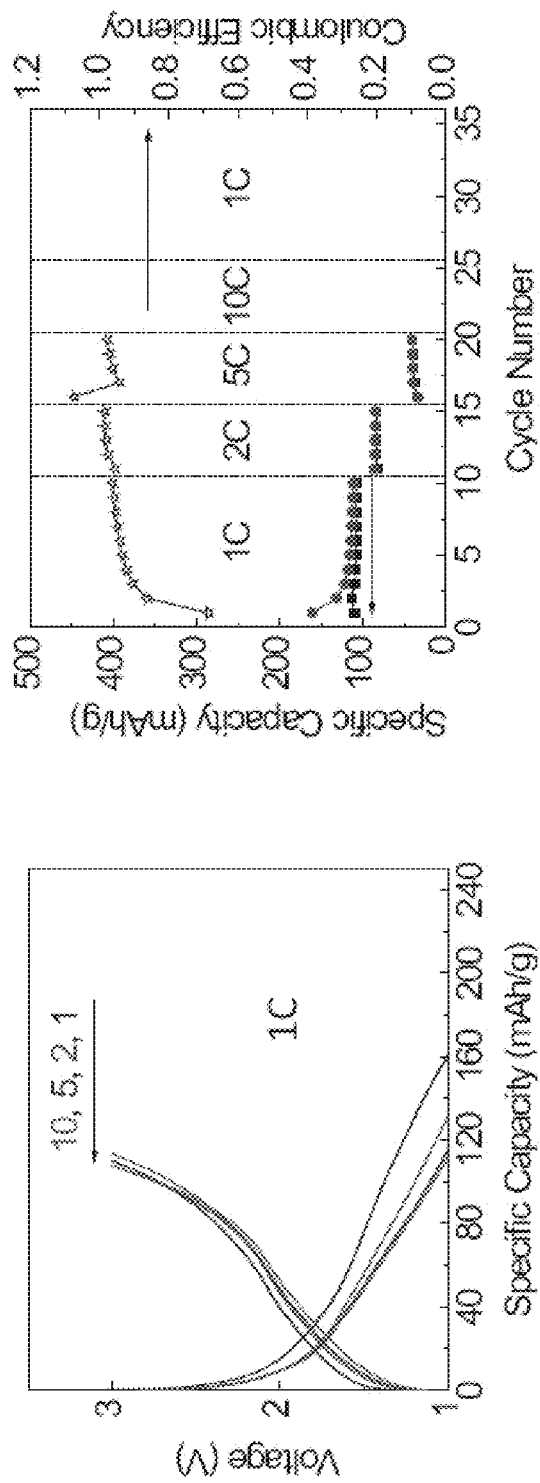
FIG. 11 shows more electrochemical measurements for titanium oxide graphene material (annealed at 600° C. for 1 hour under $N_2$ flow).
Figure 16:
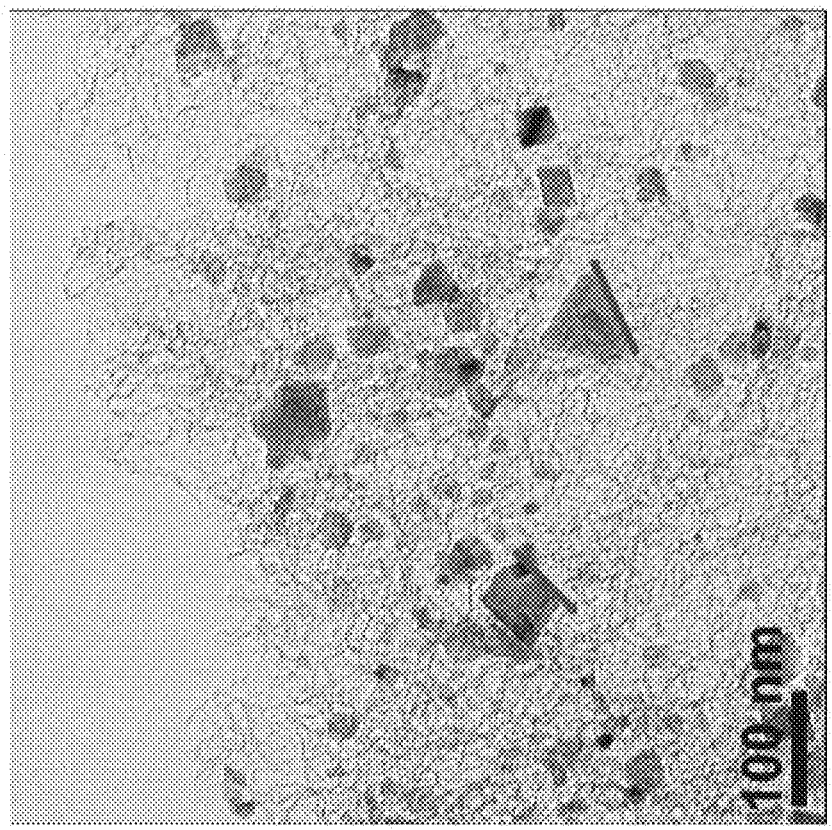
FIG. 16. Additional TEM image of graphene/($\alpha$+$\gamma$)-$Fe_2O_3$ (40 wt. %), indicating the faceted nature of as-grown particles as manifested by the rather straight edges in 2D projection.
Figure 17:
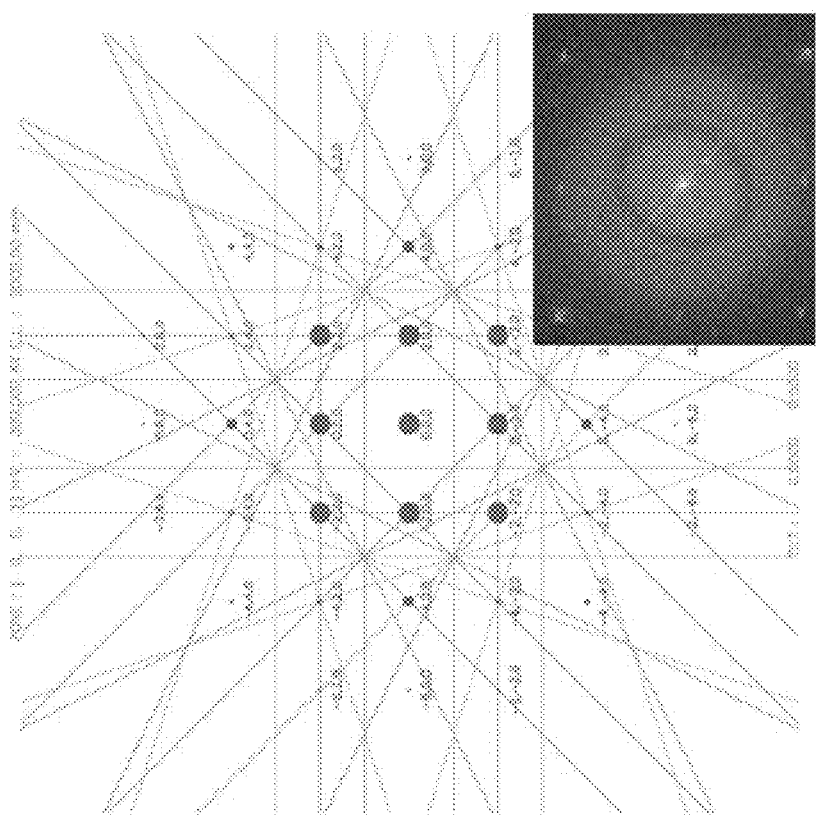
FIG. 17. A comparison of simulated $Li_2O$ (cubic) diffraction patterns along <100> zone axis with the FFT pattern (inset) from our experiments. A good match is found. The simulation was performed using the online version of WebEMAPS software.
Figure 18:
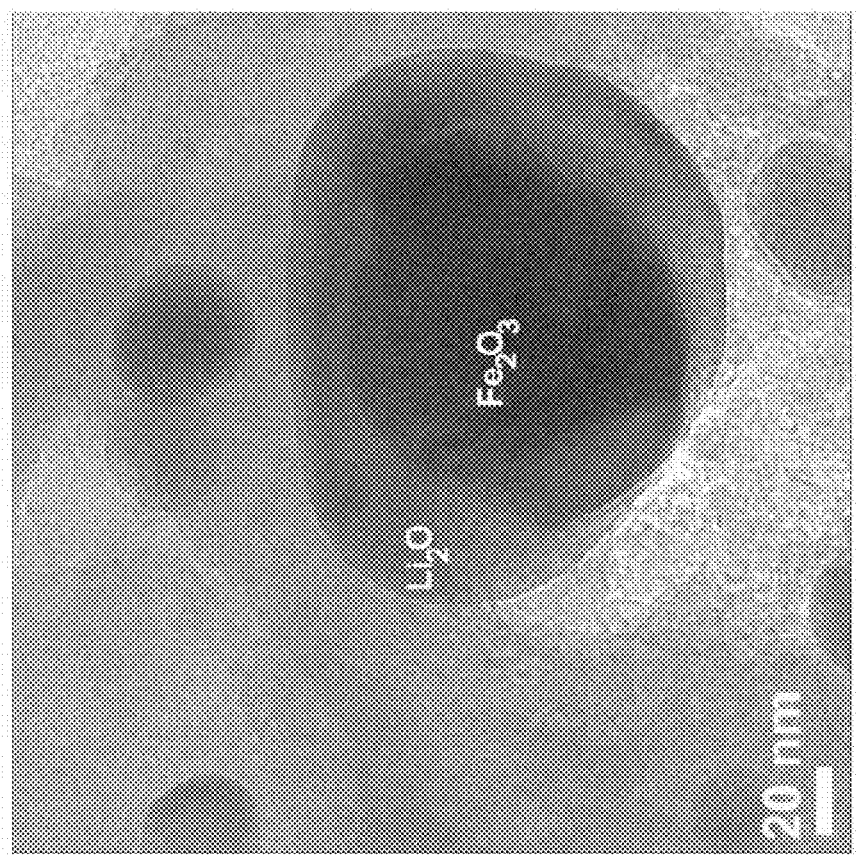
FIG. 18. A bright-field TEM image of the lithiated graphene/($\alpha$+$\gamma$)-$Fe_2O_3$ (40 wt. %) after 30 cycles, showing a partially lithiated particle.
Figure 19:
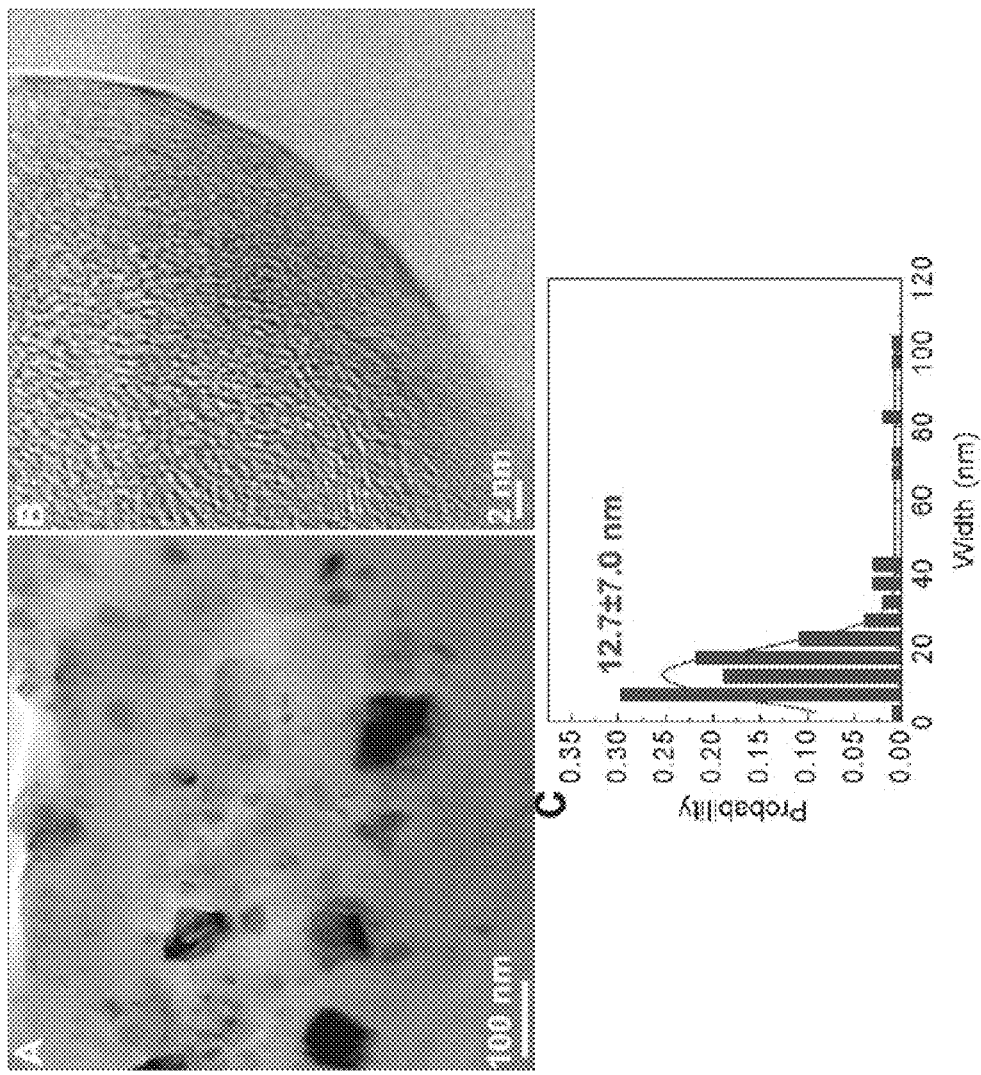
FIG. 19. Microstructures of graphene/($\alpha$+$\gamma$)-$Fe_2O_3$ (40 wt. %) after 30 cycles. The final state of the sample is charged to 3V (i.e., delithiated). (A) A TEM image of graphene/$Fe_2O_3$, showing the faceted characteristics of particles. (B) A high-resolution TEM of a selected particle. (C) The particle size distribution from the count of 101 particles. The fitting by lognormal distribution yields an average particle size of 12.7+/−7.0 nm.

To further investigate the atomic scale mechanisms, TEM samples were prepare after multiple cycles inside the glove box and transferred to the TEM holder using an argon (99.999+% purity) sealed vial. In order to expose and better reveal the nanoparticle morphologies, the electrochemically cycles samples were washed in acetonitrile for more than 10 hrs. The microstructures of graphene/$Fe_2O_3$ in both fully lithiated and delithiated states were investigated (after 30 cycles), respectively. Under the lithiated state, FIG. 6A, almost all particles exhibited oval or spherical shapes, with black-and-white contrast co-existing often within one single nanoparticle. The round geometries of the nanoparticles were in contrast to the faceted nature of particles seen in the as-synthesized state (see FIG. 2C and FIG. 16). A zoomed-in TEM image shown in FIG. 6B revealed the existence of pure Fe nanoparticle surrounded by $Li_2O$, as evidenced by the lower contrast of $Li_2O$ and the crystalline morphology of Fe metal. Under the high-resolution TEM, lattice fringes were not readily visible for some $Li_2O$ particles, suggesting the semi-amorphous nature of this phase. These postmortem TEM examinations confirmed the forward reaction of equation (I). Occasionally, however, crystalline $Li_2O$ particles were found, two examples of which are shown in FIG. 6C. Both particles were identified to have the zone axis of <100>, as confirmed by the inset fast-Fourier transformation (FFT) pattern (i.e., both areas have the identical FFT patterns) and diffraction pattern simulations (FIG. 17). The existence of these somewhat isolated $Li_2O$ could be related to the method for preparing the TEM samples. Intriguingly, partially lithiated $Fe_2O_3$ particles were also located inside the hybrid samples (FIG. 18). This behavior seemed to only occur to some rather large $Fe_2O_3$ particles (>250 nm). This may suggest that the lithiation/delithiation behavior of metal oxides is very sensitive to their sizes and agglomerations— an observation that supports some earlier reports (Poizot et al., Nature 2000, 407 (6803), 496-499). These results accentuate the importance of using nanosized metal oxide particles for Li storage, and echo the good cycle performance of the graphene/$Fe_2O_3$ sample. It is found that the round shape nanoparticles can be reversed back to the faceted nanocrystals after they are fully delithiated, as further confirmed by TEM investigations (FIG. 19). The statistical particle size distribution after 30 cycles revealed insignificant average size changes (with a slightly larger standard deviation). This could be attributed to the excellent confinement effect of graphene sheets and the prevalent nanoparticles in the graphene/$Fe_2O_3$ samples that are more resistant to pulverization compared to microsized counterparts.

Figure 20:
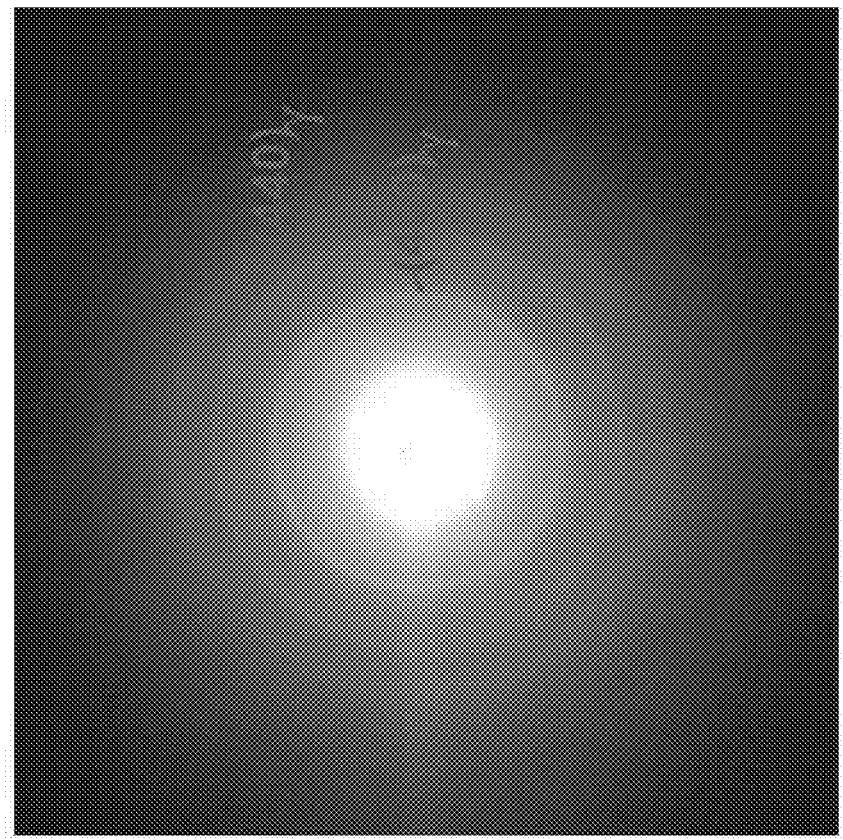
FIG. 20. Selected area diffraction (SAD) pattern taken from a graphene/($\alpha$+$\gamma$)-$Fe_2O_3$ (40 wt. %) sample after 30 cycles and charged to the delithiated state (3.0V). The as-synthesized sample contains both $\alpha$- and $\gamma$-$Fe_2O_3$.

Intriguingly, TEM studies further reveal the disappearance of α-phase for $Fe_2O_3$ after 30 cycles, as indicated by the SAD pattern (FIG. 20), which suggests that only γ-$Fe_2O_3$ remains. Furthermore, the SAD pattern no longer yields bright diffraction spots except for the continuous rings, indicating the disintegration of any preexisting large particles or the transformation of single-crystalline to polycrystalline $Fe_2O_3$ particles upon long-term cycles. The preference of α-$Fe_2O_3$ transformation to more open cubic structure (i.e., γ-$Fe_2O_3$) during the Li-ion intercalation has been reported previously (Larcher et al., Electrochem. Soc. 2003, 150 (12), A1643-A1650; Jain et al., Chem. Mater. 2006, 18 (2), 423-434), which was also found not to revert back to the hexagonal α-$Fe_2O_3$. These earlier observations agree with our TEM investigations. This structural irreversibility, however, does not seem detrimental to the electrochemical reversibility of our hybrid materials, as we observe similar specific capacity for two comparison samples [see FIG. 7B, (α+γ)-$Fe_2O_3$ vs. γ-$Fe_2O_3$].

Figure 21:
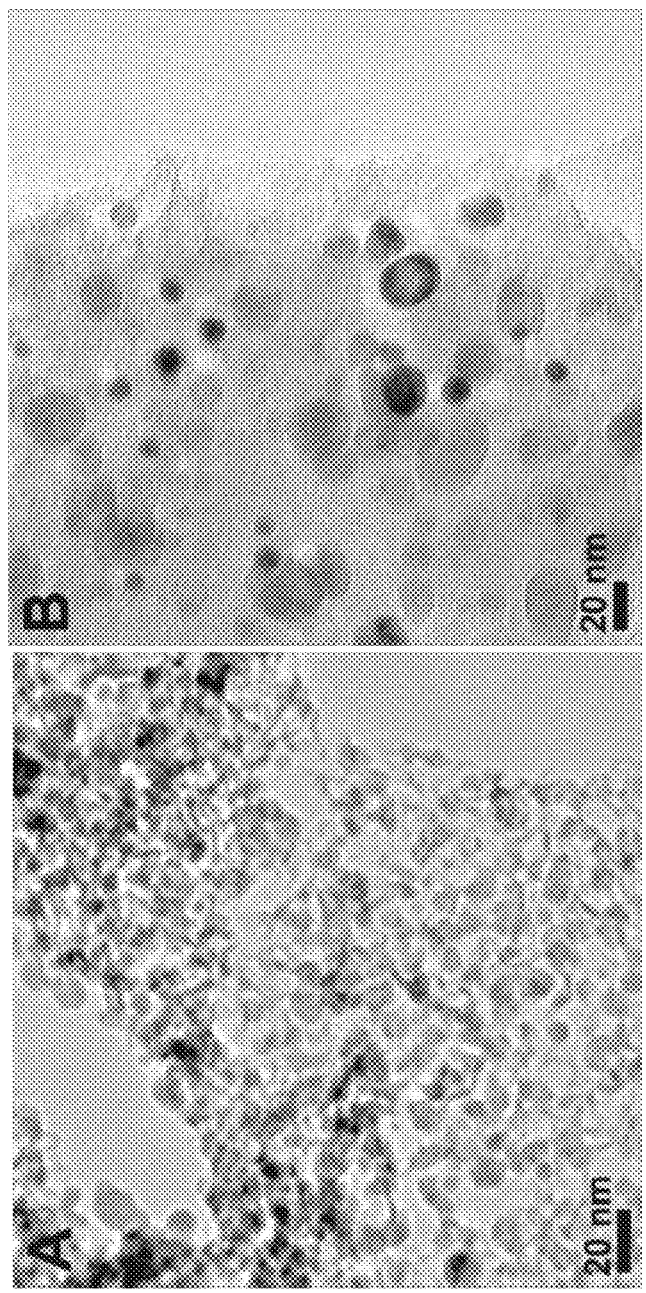
FIG. 21. Bright-field TEM images of graphene/$\gamma$-$Fe_2O_3$ (56 wt. %) in (A) the as-synthesized state, and (B) the lithiated state after 5 cycles. The particle sizes reported in FIG. 7B are measured from a series of TEM images similar to the ones shown above. The average particle sizes for the as-synthesized $\gamma$-$Fe_2O_3$ and the lithiated state are 8.1+/−1.2 nm (from 100 counts) and 20.6+/−7.5 nm (from 134 counts), respectively.
Figure 22:
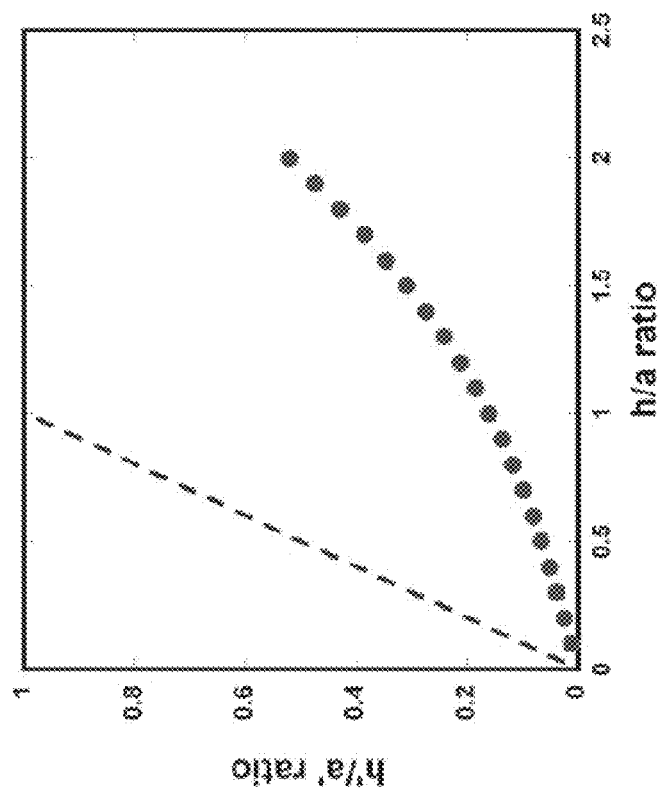
FIG. 22. The calculated ratio change (h'/a') after the lithiation, as a function of the initial particle shape defined by h/a (see Spherical-cap model section for the details). The blue dashed line denotes (h'/a')/(h/a)=1 (i.e., uniform expansion line). Note the substantial reduction of h'/a' after the lithiation, suggestive of "pancake" shape-change behavior. The calculation parameters are 2a=8.1 nm, and 2a'=20.6 nm, both of which are measured by TEM (see FIG. 7B, $\gamma$-$Fe_2O_3$ and FIG. 21). The volume expansion is assumed as ~96%.

Another important observation from TEM studies is that the average diameter of nanoparticles is found to increase by more than a factor of 2.5 in the lithiated state (FIG. 7B, and FIG. 21). This would have projected a volume expansion of over a thousand percentages provided that nanoparticles were in spherical shape and expanded uniformly during the lithiation. We observed this diameter change trend in both sets of samples that have been examined under TEM. To understand this apparent paradox of the measured particle sizes and the projected volume expansions, we perform empirical analysis using a spherical-cap model that is consistent with classical nucleation and growth theory of particles on a flat surface. Our calculations, interestingly, suggest that nanoparticles are likely to change their aspect ratios and "spread" preferentially along the graphene/nanoparticles interfaces (i.e., anchored interfaces) upon the lithiation, leading to pancakelike shapes that are supported by our TEM observations. FIG. 6D schematically illustrates the nanoparticles expansion process on graphene sheet (also see FIG. 22). This surprising particle shape change is probably because the conversion reaction, which requires the participation of electrons (Eqn. 1), occurs preferentially on the graphene surface. Because electron transport within metal oxides ($Fe_2O_3$ and $Li_2O$) is extremely sluggish due to their poor conductivity, the reaction is kinetically favored to take place on the graphene surface, where electrons can easily reach the reaction front through facile transport within the graphene layer. In addition, ion species (e.g. $Li^+$ and $O^2$) are likely to have larger mobility along the solid/graphene or liquid/graphene interface than in the solid phases, further promoting graphene surface as the preferred reaction site. Consequently, the reaction product ($Li_2O$+Fe) upon lithiation has a larger growth rate along the graphene sheets, which produces a significant change in the aspect ratio of the nanoparticles. Furthermore, the average $Fe_2O_3$ particle size in the delithiated state after 30 cycles measured from TEM images shows insignificant change from the as synthesized state, indicating the reversibility of most particle shape changes.

The finding of the significant shape change of $Fe_2O_3$ nanoparticles upon (de)lithiation prompts us to propose one possible reason for the synergistic effect observed in the graphene/$Fe_2O_3$ hybrid electrodes. After multiple charge/discharge cycles, our graphene/$Fe_2O_3$ samples exhibit a reversible capacity that is notably larger than the theoretical capacity of $Fe_2O_3$ itself (i.e., 56 wt. % $Fe_2O_3$ contributes a maximum of ~563 mAh/g capacity), indicating that the hybrid capacity also derives from sources other than $Fe_2O_3$. The presence of multiple peaks and a large background on the differential capacity curves (FIGS. 4C and D) suggests that the extra capacity could have several contributions, involving $Li^+$ binding to graphene and its structural defects, reaction between $Li^+$ and impurity (e.g., residual oxygen), and/or the formation of organic gel-like films. While the detailed mechanisms of such auxiliary reactions remain to be clarified, it is plausible that they occur predominantly on the graphene surface because of easy access to electrons. However, a remarkable finding of this work is that these possible reactions only contribute significantly to reversible capacity in the presence of $Fe_2O_3$ nanoparticles. In the pure GMA sample, the discharge capacity is merely ~148 mAh/g after 10 cycles at a current density of 100 mA/g and even lower at higher discharge rates.

Figure 25:
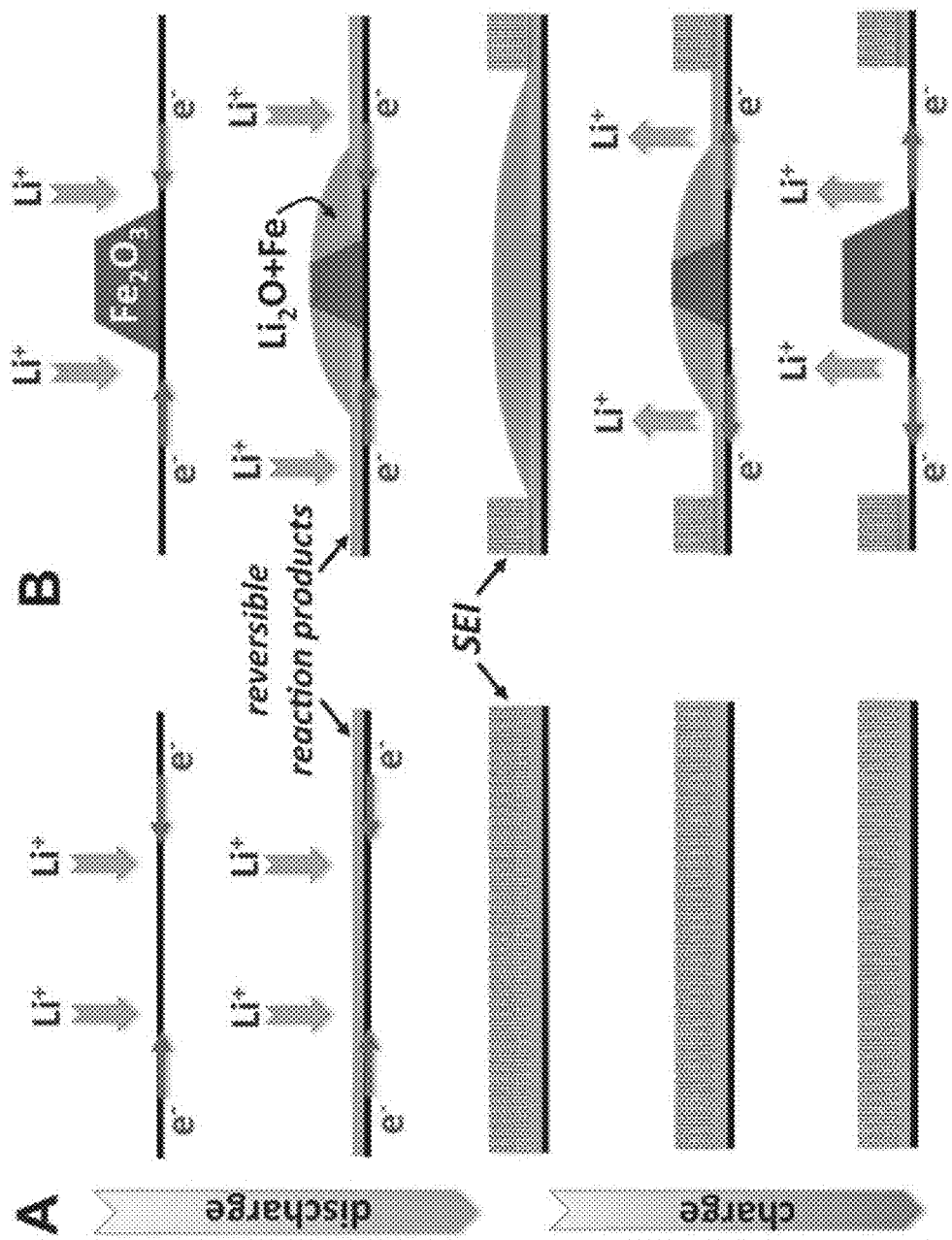
FIG. 25. (a) Schematics of solid-electrolyte-interphase (SEI) formation on graphene surface upon discharge and its effect on suppressing surface reactions that contribute to reversible Li storage capacity. (b) Schematics of a proposed, possible mechanism for additional reversible capacity that is enabled by $Fe_2O_3$ particle expansion/shrinkage on top of the graphene surface.

It is well known that side reactions (e.g. electrolyte decomposition) cause SEI formation on the surface of battery anodes (e.g. graphite, silicon) during the first few cycles (Arora et al., J. Electrochem. Soc. 1998, 145 (10), 3647-3667; Peled, E., Lithium stability and film formation in organic and inorganic electrolytes for lithium battery systems, Academic Press: New York, 1983; page 43; Huang et al., Science 2010, 330 (6010), 1515-1520). The large irreversible capacity (~700 mAh/g) seen in the pure GMA sample upon first discharge may be attributed to the formation of a stable SEI film on graphene surface. This SEI layer could be responsible for the very low reversible capacity in subsequent cycles by passivating the graphene surface and inhibiting the reversible reactions mentioned above, FIG. 25A. In the graphene/$Fe_2O_3$ hybrid electrodes, however, we propose that the preferential expansion of nanoparticles on graphene sheets upon lithiation plays a critical role in covering the graphene surface to prevent SEI formation on the top while still allowing the reversible auxiliary reactions to occur forwardly, as illustrated in FIG. 25B. As the particles shrink during delithiation, the surface underneath is re-exposed to the electrolyte and becomes delithiated. The graphene surface around Fe2O3 nanoparticles can thus remain SEIfree upon cycling and contribute to the reversible capacity. This scenario is consistent with the persistent appearance of the graphene-related oxidation peaks (O2 and O5) on the differential capacity curves (FIG. 24D).

To estimate the surface area "protected" by the nanoparticles, we measured the average particle size of a hybrid sample (56 wt. % $Fe_2O_3$) consisting of only γ-$Fe_2O_3$ from TEM images, which is 8.1 nm in the pristine state and 20.6 nm in the lithiated state. Using these data and assuming that the pristine $Fe_2O_3$ particles have a hemispherical shape, a simple calculation shows that the nanoparticles will cover ~41% of the total graphene surface area in the lithiated state (up from 6% in the delithiated state). The actual coverage may be even higher considering that we use the upper limit of GMA's measured specific surface area (~1500 $m^2/g$) in the calculation and the graphene sheets in our sample are highly curved and could make contact with $Fe_2O_3$ particles on multiple sides. Therefore, the auxiliary reactions can occur on a large fraction of the graphene surface, which is consistent with the significant synergistic capacity enhancement seen in our hybrid samples. The mechanism we propose here may also explain the similar effect previously reported for several other graphene/metal oxides systems (Zhu et al., ACS Nano 2011, 5 (4), 3333-3338; Wang et al., J. Am. Chem. Soc. 2010, 132 (40), 13978-13980; Wu et al., ACS Nano 2010, 4 (6), 3187-3194), although it remains to be confirmed that metal oxide particles in these samples undergo an analogous shape change upon cycling. A significant and verifiable prediction from our hypothesis is that decreasing the particle size of metal oxides will lead to larger graphene-related reversible capacity, as the surface area covered by lithiated particles scales inversely with particle diameter.

By taking advantage of the unique mechanical robustness and high electrical conductance of 3D graphene assembly, we have developed a scalable approach to fabricating additive-free 3D graphene/$Fe_2O_3$ hybrid electrodes with commercially viable thickness for Li-ion batteries. As anodes graphene/$Fe_2O_3$ nanoporous films exhibit a high reversible capacity (>850 mAh/g at 100 mA/g), good rate performance and cycling stability. We observe a strong synergistic effect in the hybrids that cannot be offered by the simple conversion reactions of metal oxides or graphene alone. TEM investigations reveal major atomic processes of conversion reactions for $Fe_2O_3$ and a size-dependent lithiation/delithiation behavior. These mechanistic studies stress the importance of employing nanosized particles in retaining high specific capacity and good rate performance of the hybrid materials. Note that $Fe_2O_3$ is an insulating material with poor electrical conductivity, which has to rely solely on the 3D graphene networks to deliver electrons and offer mechanical support. Our work thus demonstrates the enabling roles of 3D graphene in providing a conductive network and maintaining structural integrity of the electrodes without the need for carbon additives or polymer binders. Based on the TEM observations, we propose a graphene surface protection mechanism mediated by metal oxide particle shape change to rationalize the synergistic effect, which may shed light on the pathway towards further optimization of graphene/metal oxide electrodes. Our synthetic method can be extended to other transition metal oxides, and with the availability of relatively cheap graphene materials, is likely to provide a viable route to the fabrication of high-performance electrodes for LIBs In summary, the working examples help demonstrate a scalable approach to fabricating commercial thickness electrodes, using 3D graphene assembly was developed. The carbon-black- and binder-free graphene/$Fe_2O_3$ nanoporous materials as anodes exhibited a high reversible capacity (~1166 mAh/g at 100 mAh/g current density), good rate performance and cycle stability. A strong synergistic effect in the hybrids was observed that cannot be offered by the simple conversion reactions of metal oxides or graphene alone. The contributions of graphene to the specific capacity and rate performance were drastically improved with the existence of metal oxides. TEM investigations revealed some atomic processes of conversion reactions for $Fe_2O_3$ and a strong size-dependent lithiation/delithiation behavior. The synthetic method described here is expected to apply to other transition metal oxides as well, and thus provide a viable route to engineering high-performance electrodes for lithium ion batteries.

Conclusion

Despite a number of reports on graphene-based metal oxide anode materials, the prior art approaches are either not easily scalable to large thickness for electrodes or require carbon additives and/or polymeric binders. Reported here is an ultra-thick (~250 μm), carbon-black-free and binder-free 3-dimensional (3D) graphene/$Fe_2O_3$ hybrid architecture, where $Fe_2O_3$ nanoparticles (~12.5±5.5 nm) are anchored and tented inside graphene networks. The graphene/$Fe_2O_3$ hybrids are freestanding films and mechanically robust. As an anode material, graphene/$Fe_2O_3$ offers a large reversible specific capacity of ~1166 mAh/g at the current density of 100 mAh/g after 30 cycles, and good rate performance. A strong synergistic behavior between $Fe_2O_3$ and 3D graphene networks was observed that cannot be offered by the mathematic addition of the conversion reaction of $Fe_2O_3$ and the lithium intercalations into graphene. Scanning and transmission electron microscopy after various electrochemical cycles revealed the significance of interplay between $Fe_2O_3$ and graphene, and strong size-dependent electrochemical behavior of metal oxides. The synthetic approach demonstrates a viable scale-up route to constructing graphene/metal oxides as anode materials for Li-ion battery, and further the understanding on the Li storage ability/mechanisms inside the hybrid structures.

The synthesized nanoporous graphene/$Fe_2O_3$ hybrids as anodes have the following advantageous characteristics: (1) carbon-black- and binder-free. Although graphene has been widely reported as conductive backbone for metal oxides, carbon-black- and binder-free electrodes are rare. (2) Scalability. The nanoporous graphene/$Fe_2O_3$ hybrids are ready-to-use freestanding nanoporous films, with an impressive thickness of ~250 μm—which is at least one order of magnitude thicker than any graphene/metal oxides electrodes reported so far. No further processing or mixing is needed. This advantage is a product of the GMA scaffold, which has a large fraction of nanometer-sized pores and an open pore structure, and thus allows the electrolyte in direct contact with most $Fe_2O_3$ nanoparticles in all portions of the electrode. The small pores physically limit the growth of nanoparticles, significantly shortening the Li ion diffusion pathway in the anode. In addition, nanopores force multiple sides of nanoparticles in close contact with graphene sheets (see FIG. 1), leading to tented nanoparticle structures that facilitate efficient electron transport to the conductive electrode. As such, the measured specific capacity of the nanoporous graphene/$Fe_2O_3$ hybrids is essentially thickness independent. This is in contrast to other carbon-black- and binder-free nanoparticle films, which show fast capacity fading as the thickness increases by only a few micrometers (Ha et al., Nano Lett. 2012, 12 (10), 5122-5130). (3) High surface area, high electrical conductivity, and mechanical robustness. These properties are attributed to the 3D construction which uses conductive and strong carbon cross-links between graphene sheets and the remarkable properties of individual graphene sheets. This combination of traits is not readily achievable in many other nanoporous materials, which often have low electrical conductivity, low strength, or closed pores, and thus are not suitable for electrode applications.

Example 2

Graphene-$TiO_2$ Monolith

The $TiO_2$ sol-gel was prepared via a two-step process involving acid-catalyzed hydrolysis of titanium (IV) ethoxide (1 g) using water (85.7 ml), hydrochloric acid (37%, 71.4 ml), and ethanol (3.57 g), followed by base-initiated gelation using propylene oxide (0.357 g). Composites were synthesized by infiltration of graphene macroassemblies (GMA) by the oxide sol-gel solutions prior to gelation. The graphene monoliths were immersed in the sol-gel solutions and placed under vacuum until no more air escaped from the scaffolds, indicating full penetration of the sol. The concentration of inorganic precursors was kept low to promote the growth of the condensed inorganic phase primarily on the surfaces of the 3D graphene framework, while minimizing gelation in the free pore volume of the aerogel. The infiltrated graphene aerogels were then cured at room temperature for 72 h to produce the wet oxide/GMA gels. The wet oxide/GMA gels were dried using supercritical extraction with liquid $CO_2$ to yield the final dry oxide/GMA composites Annealing at 320C in air for 5 hours was used to convert the $TiO_2$ to the anatase crystalline phase.

FIGS. 8-11 show x-ray, Raman, and electrochemical characterization.

After annealing, amorphous $TiO_2$ transit into anatase phase with grain size of ~3 nm.

Li storage capacity decreased from 156 mAh/g to 110 mAh/g in the first delithiation process.

The coulombic efficiencies were similar.

While not limited by theory, the decrease of capacity may be attributed to the oxygen deficiency in the annealed sample.

Example 3

Graphene-$SiO_2$ Monolith

The graphene macroassembly (GMA) scaffolds were prepared as described in Worsley et al., Chem. Commun. 48:8428-8430 (2012). The oxide/GMA composites were prepared through deposition of an oxide coating over the inner surface area of the GMA framework using sol-gel chemistry. The $SiO_2$ sol-gel was prepared via traditional one-step base-catalyzed alkoxide sol-gel chemistry using tetramethoxysilane (4.1 g), water (1.5 g), ammonium hydroxide (30%, 200 ml), and methanol (24 g). See Iler, R. K., The Chemistry of Silica. 1979, New York: John Wiley & Sons. 896, incorporated herein by reference in its entirety.

Composites were synthesized by infiltration of GMA monoliths by the oxide sol-gel solutions prior to gelation. The GMA's were immersed in the sol-gel solutions and placed under vacuum until no more air escaped from the scaffolds, indicating full penetration of the sol. The concentration of inorganic precursors was kept low to promote the growth of the condensed inorganic phase primarily on the surfaces of the GMA framework, while minimizing gelation in the free pore volume of the aerogel. The infiltrated GMAs were then cured at room temperature for 72 h to produce the wet oxide/GMA gels. The wet oxide/GMA gels were dried using supercritical extraction with liquid $CO_2$ and annealed to yield the final dry oxide/GMA composites.

Example 4

Graphene-$SnO_2$ Monolith

The graphene macroassembly (GMA) scaffolds were prepared as described in Worsley et al., Chem. Commun. 48:8428-8430 (2012). The oxide/GMA composites were prepared through deposition of an oxide coating over the inner surface area of the GMA framework using sol-gel chemistry. The $SnO_2$ sol-gel was prepared via an epoxide-initiated gelation method using tin chloride pentahydrate (0.56 g), trimethylene oxide (1.03 g), ethanol (7 g), and water (5 g). See Baumann et al., Advanced Materials 17(12): 1546-1548 (2005), incorporated herein by reference in its entirety.

Composites were synthesized by infiltration of GMA monoliths by the oxide sol-gel solutions prior to gelation. The GMA's were immersed in the sol-gel solutions and placed under vacuum until no more air escaped from the scaffolds, indicating full penetration of the sol. The concentration of inorganic precursors was kept low to promote the growth of the condensed inorganic phase primarily on the surfaces of the GMA framework, while minimizing gelation in the free pore volume of the aerogel. The infiltrated GMAs were then cured at room temperature for 72 h to produce the wet oxide/GMA gels. The wet oxide/GMA gels were dried using supercritical extraction with liquid $CO_2$ and annealed to yield the final dry oxide/GMA composites.

What is claimed is:

1. A composition comprising at least one graphene-supported metal oxide monolith, said monolith comprising (i) a three-dimensional network of graphene sheets crosslinked by covalent carbon bonds, and (ii) at least one metal oxide embedded inside said three-dimensional network, wherein the graphene-supported metal oxide monolith is mesoporous, wherein the graphene-supported metal oxide monolith has a surface area of at least 500 $m^2$/g, wherein the metal oxide accounts for 40-80 wt. % of the graphene-supported metal oxide monolith, and wherein the metal oxide comprises manganese, iron, cobalt, nickel, copper, zinc, zirconium, tin, silicon, aluminum, chromium, vanadium, titanium, or combinations thereof.

2. The composition of claim 1, wherein the graphene sheets are randomly oriented.

3. The composition of claim 1, wherein the covalent carbon bonds for crosslinking the graphene sheets are primarily $sp^2$ bonds.

4. The composition of claim 1, wherein the monolith has a thickness of 100 μm or more.

5. The composition of claim 1, wherein the metal oxide is in particle form and has an average particle diameter of 50 nm or less.

6. The composition of claim 1, wherein the metal oxide is $Fe_2O_3$.

7. The composition of claim 1, wherein the metal oxide is $TiO_2$, $SiO_2$, or $SnO_2$.

8. An electrode comprising the composition of claim 1, wherein the electrode is substantially free of any carbon-black and substantially free of any binder.

9. An electrode comprising the composition of claim 1.

10. A device comprising the electrode of claim 9.

11. The device of claim 10, wherein the monolith is incorporated in an electrode, and wherein the device further comprising at least one counter electrode, at least one electrolyte, at least one separator, and at least one current collector.

12. The device of claim 10, wherein the monolith is incorporated in an electrode, wherein the electrode has a thickness of 100 μm or more, and wherein the electrode is substantially free of any carbon-black and substantially free of any binder.

13. The device of claim 10, wherein the metal oxide is $Fe_2O_3$, and wherein the device is a lithium ion battery having a discharge capacity of at least 500 mAh/g at 100 mA/g after 30 cycles.

14. The device of claim 10, wherein the metal oxide is $TiO_2$, and wherein the device is a lithium ion battery having a discharge capacity of at least 100 mAh/g at 168 mA/g.

15. The device of claim 10, wherein the device is a battery, a capacitor, or a sensor.

16. The device of claim 10, wherein the graphene sheets are coated by at least one particulate metal oxide.

17. The device of claim 10, wherein the graphene sheets are coated by at least one nanoparticulate metal oxide.

* * * * *